United States Patent
Pavlov et al.

(10) Patent No.: US 11,861,402 B2
(45) Date of Patent: Jan. 2, 2024

(54) METHODS AND APPARATUS FOR TENANT AWARE RUNTIME FEATURE TOGGLING IN A CLOUD ENVIRONMENT

(71) Applicant: VMware, Inc., Palo Alto, CA (US)

(72) Inventors: Daniel Pavlov, Sofia (BG); Boris Savov, Sofia (BG); Kristiyan Georgiev, Sofia (BG); Grigor Ganekov, Sofia (BG); Zhan Ivanov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 420 days.

(21) Appl. No.: 16/912,314

(22) Filed: Jun. 25, 2020

(65) Prior Publication Data

US 2021/0406073 A1 Dec. 30, 2021

(51) Int. Cl.
*G06F 9/50* (2006.01)
*G06F 9/455* (2018.01)
*G06F 16/23* (2019.01)

(52) U.S. Cl.
CPC ........ *G06F 9/5011* (2013.01); *G06F 9/45558* (2013.01); *G06F 16/2365* (2019.01); *G06F 2009/45591* (2013.01)

(58) Field of Classification Search
None
See application file for complete search history.

(56) References Cited

U.S. PATENT DOCUMENTS

| | | | |
|---|---|---|---|
| 9,798,593 B1* | 10/2017 | Maiorano Quiroga ... | G06F 9/52 |
| 10,630,808 B1* | 4/2020 | Watt .................... | H04L 67/1014 |
| 2005/0273667 A1* | 12/2005 | Shrivastava ......... | G06F 11/0709 714/47.2 |
| 2009/0106350 A1* | 4/2009 | Chen ........................ | G06F 9/54 709/203 |
| 2009/0287845 A1* | 11/2009 | Joshi ...................... | G06F 9/546 709/238 |
| 2010/0017868 A1* | 1/2010 | Hao ........................ | H04L 69/22 726/11 |
| 2010/0082549 A1* | 4/2010 | Hollingsworth ...... | G06F 16/252 707/665 |
| 2010/0153160 A1* | 6/2010 | Bezemer .............. | G06Q 10/109 705/348 |
| 2011/0016342 A1* | 1/2011 | Rowan ................ | G06F 11/3062 713/340 |
| 2012/0166421 A1* | 6/2012 | Cammert ............ | G06F 16/2425 707/765 |
| 2012/0194502 A1* | 8/2012 | Smith ...................... | G06F 8/38 345/418 |

(Continued)

*Primary Examiner* — Adam Lee
(74) *Attorney, Agent, or Firm* — HANLEY, FLIGHT & ZIMMERMAN, LLC

(57) ABSTRACT

Methods, apparatus, systems, and articles of manufacture to provide tenant aware runtime feature toggling in a cloud or other virtualized computing environment are disclosed. An example method includes determining a feature toggle associated with a resource of a provisioning request; retrieving the feature toggle from a database using a first tenant identifier, the feature toggle to have a first value for the first tenant identifier and a second value for a second tenant identifier; processing the feature toggle to provision the resource according to the first value of the feature toggle; and facilitating provisioning of the resource according to the first value.

18 Claims, 12 Drawing Sheets

(56) References Cited

U.S. PATENT DOCUMENTS

| | | | | |
|---|---|---|---|---|
| 2012/0297390 | A1* | 11/2012 | Heath, III | G06F 9/5038 |
| | | | | 718/102 |
| 2013/0110795 | A1* | 5/2013 | DeRose | G06F 40/137 |
| | | | | 707/694 |
| 2013/0124962 | A1* | 5/2013 | Mitchell | G06F 40/103 |
| | | | | 715/229 |
| 2013/0275185 | A1* | 10/2013 | Dan | G06Q 10/10 |
| | | | | 705/7.37 |
| 2014/0059199 | A1* | 2/2014 | Do | G06F 11/26 |
| | | | | 709/224 |
| 2014/0181256 | A1* | 6/2014 | Trifa | H04L 67/54 |
| | | | | 709/218 |
| 2014/0297833 | A1* | 10/2014 | Bedini | G06F 9/5083 |
| | | | | 709/224 |
| 2015/0066573 | A1* | 3/2015 | Damonte | G06Q 10/06316 |
| | | | | 705/7.26 |
| 2015/0106753 | A1* | 4/2015 | Tran | G05B 23/0272 |
| | | | | 715/765 |
| 2015/0235154 | A1* | 8/2015 | Utschig | G06Q 10/0637 |
| | | | | 705/7.36 |
| 2016/0246594 | A1* | 8/2016 | Shoavi | H04W 4/18 |
| 2017/0262261 | A1* | 9/2017 | Santiago | G06F 9/44521 |
| 2017/0315712 | A1* | 11/2017 | Curtis | G06F 3/0632 |
| 2018/0270246 | A1* | 9/2018 | Fukuda | H04L 63/0876 |
| 2019/0068458 | A1* | 2/2019 | Stefanov | G06F 9/5077 |
| 2019/0073227 | A1* | 3/2019 | Zhong | G06F 9/4492 |
| 2019/0138318 | A1* | 5/2019 | Yang | G06F 9/451 |
| 2019/0317887 | A1* | 10/2019 | Wiener | G06F 11/3664 |
| 2020/0293943 | A1* | 9/2020 | Vadella | G06N 20/00 |
| 2021/0026594 | A1* | 1/2021 | Kessler | G06F 40/295 |
| 2021/0117263 | A1* | 4/2021 | Dunne | G06F 11/3065 |

* cited by examiner

METHODS AND APPARATUS FOR TENANT AWARE RUNTIME FEATURE TOGGLING IN A CLOUD ENVIRONMENT

FIELD OF THE DISCLOSURE

This disclosure relates generally to cloud computing, and, more particularly, to methods and apparatus for tenant aware runtime feature toggling in a cloud environment.

BACKGROUND

Virtualizing of computer systems provides benefits such as an ability to execute multiple computer systems on a single hardware computer, replicating computer systems, moving computer systems among multiple hardware computers, and so forth.

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may include many processing units (e.g., servers). Other components of a cloud computing environment include storage devices, networking devices (e.g., switches), etc. Current cloud computing environment configuration relies on much manual user input and configuration to install, configure, and deploy the components of the cloud computing environment. Further, many code and deployment changes reside in transitory memory that is cleared upon a reboot, restart, or reset of the environment.

Figure 1:
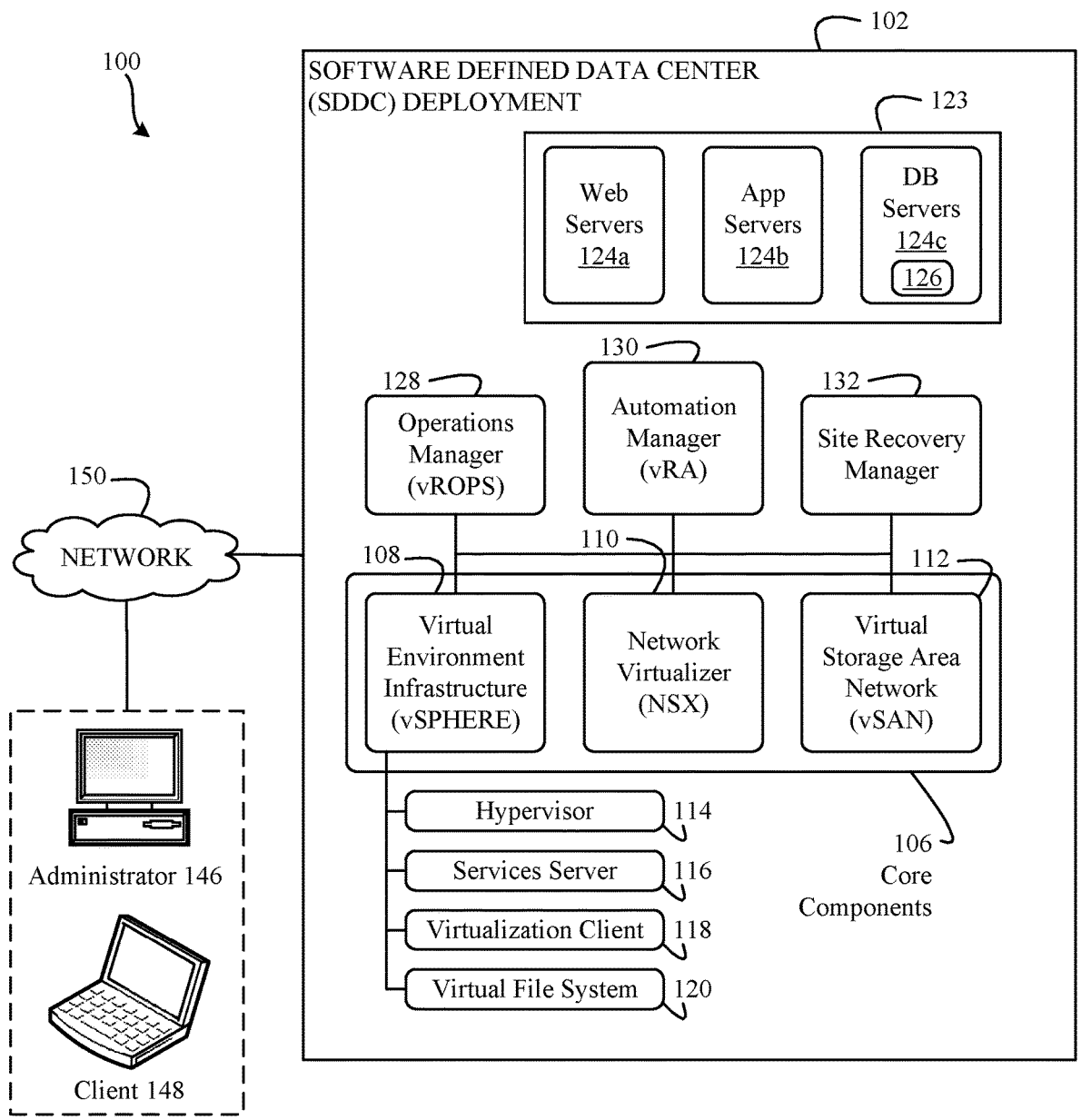
FIG. 1 illustrates an example environment of use including a software-defined data center (SDDC) implemented in accordance with the teachings of this disclosure.

The figures are not to scale. Instead, the thickness of the layers or regions may be enlarged in the drawings. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Cloud computing platforms may provide many powerful capabilities for performing computing operations. However, taking advantage of these computing capabilities manually may be complex and/or require significant training and/or expertise. Prior techniques for providing cloud computing platforms and services often require customers to understand details and configurations of hardware and software resources to establish and configure the cloud computing platform. Configuring such cloud computing platforms may involve long running operations and/or complex operations (e.g., a sequence of operations including multiple steps).

For example, an operation to deploy an application on a virtual machine may involve provisioning a virtual host, installing an operating system on the virtual host, and configuring an application for execution on the operating system. Each of such operations may be authorized in the context of a user session that is initialized based on a user (e.g., an administrator) providing their credentials. To prevent unauthorized access, user sessions typically have a relatively short expiration timeout (e.g., a session timeout of minutes, hours, etc.). In an example where the user session has a thirty minute timeout, while a first operation (e.g., deploying the virtual host) may be allowed to complete in the context of the user session. However, the session may expire prior to execution of the second operation, resulting in a failure of the deployment. Methods and apparatus disclosed herein enable refresh of user tokens to prevent such failures.

A software defined data center (SDDC) is a data storage facility implemented using an infrastructure that is virtualized and delivered as a service to one or more customers. After deployment of a SDDC, the SDDC provides policy-driven automation to enable provisioning and ongoing management of logical compute resources, storage resources, and network resources. For example, customers may select/create policies that cause the SDDC to deploy applications quickly based on policy-driven provisioning that dynamically matches resources to continually changing workloads and business demands. An SDDC can be deployed as a private cloud, a hybrid cloud, or a public cloud and can run on multiple hardware stacks, hypervisors, and clouds.

A virtual machine (VM) is a software computer that, like a physical computer, runs an operating system and applications. An operating system installed on a virtual machine is referred to as a guest operating system. Because each virtual machine is an isolated computing environment, virtual machines (VMs) can be used as desktop or workstation environments, as testing environments, to consolidate server applications, etc. Virtual machines can run on hosts or clusters. The same host can run a plurality of VMs, for example.

As disclosed in detail herein, methods and apparatus disclosed herein enable automatic refresh of tokens used in deployment, configuration, and management of SDDCs and virtual machine resources in cloud computing platforms. The improvements to cloud management systems (e.g., management systems from VMware® such as the vCloud Automation Center™ (vCAC) from VMware®, the vRealize® Automation Cloud Automation Software from VMware®, or management systems from any other entity), interfaces, portals, etc. disclosed herein may be utilized individually and/or in any combination. For example, all or a subset of the described improvements may be utilized.

As used herein, availability refers to the level of redundancy required to provide continuous operation expected for the workload domain. As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD)), and power capabilities of a workload domain. As used herein, capacity refers to the aggregate number of resources (e.g., aggregate storage, aggregate CPU, etc.) across all servers associated with a cluster and/or a workload domain. In examples disclosed herein, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy, CPU speed, memory, storage, security, and/or power options).

Example Virtualization Environments

Many different types of virtualization environments exist. Three example types of virtualization environments are: full virtualization, paravirtualization, and operating system virtualization.

Full virtualization, as used herein, is a virtualization environment in which hardware resources are managed by a hypervisor to provide virtual hardware resources to a virtual machine. In a full virtualization environment, the virtual machines do not have direct access to the underlying hardware resources. In a typical full virtualization environment, a host operating system with embedded hypervisor (e.g., a VMware ESXi™ hypervisor) is installed on the server hardware. Virtual machines including virtual hardware resources are then deployed on the hypervisor. A guest operating system is installed in the virtual machine. The hypervisor manages the association between the hardware resources of the server hardware and the virtual resources allocated to the virtual machines (e.g., associating physical random access memory (RAM) with virtual RAM). Typically, in full virtualization, the virtual machine and the guest operating system have no visibility and/or direct access to the hardware resources of the underlying server. Additionally, in full virtualization, a full guest operating system is typically installed in the virtual machine while a host operating system is installed on the server hardware. Example full virtualization environments include VMware ESX®, Microsoft Hyper-V®, and Kernel Based Virtual Machine (KVM).

Paravirtualization, as used herein, is a virtualization environment in which hardware resources are managed by a hypervisor to provide virtual hardware resources to a virtual machine and guest operating systems are also allowed direct access to some or all of the underlying hardware resources of the server (e.g., without accessing an intermediate virtual hardware resource). In a typical paravirtualization system, a host operating system (e.g., a Linux-based operating system) is installed on the server hardware. A hypervisor (e.g., the Xen® hypervisor) executes on the host operating system. Virtual machines including virtual hardware resources are then deployed on the hypervisor. The hypervisor manages the association between the hardware resources of the server hardware and the virtual resources allocated to the virtual machines (e.g., associating physical random access memory (RAM) with virtual RAM). In paravirtualization, the guest operating system installed in the virtual machine is configured also to have direct access to some or all of the hardware resources of the server. For example, the guest operating system may be precompiled with special drivers that allow the guest operating system to access the hardware resources without passing through a virtual hardware layer. For example, a guest operating system may be precompiled with drivers that allow the guest operating system to access a sound card installed in the server hardware. Directly accessing the hardware (e.g., without accessing the virtual hardware resources of the virtual machine) may be more efficient, may allow for performance of operations that are not supported by the virtual machine and/or the hypervisor, etc.

Operating system virtualization is also referred to herein as container virtualization. As used herein, operating system virtualization refers to a system in which processes are isolated in an operating system. In a typical operating system virtualization system, a host operating system is installed on the server hardware. Alternatively, the host operating system may be installed in a virtual machine of a full virtualization environment or a paravirtualization environment. The host operating system of an operating system virtualization system is configured (e.g., utilizing a customized kernel) to provide isolation and resource management for processes that execute within the host operating system (e.g., applications that execute on the host operating system). The isolation of the processes is known as a container. Several containers may share a host operating system. Thus, a process executing within a container is isolated from other processes executing on the host operating system. Thus, operating system virtualization provides isolation and resource management capabilities without the resource overhead utilized by a full virtualization environment or a paravirtualization environment. Alternatively, the host operating system may be installed in a virtual machine of a full virtualization environment or a paravirtualization environment. Example operating system virtualization environments include Linux Containers LXC and LXD, Docker™, OpenVZ™, etc.

In some instances, a SDDC (or a pool of linked SDDCs) may include multiple different virtualization environments. For example, a SDDC may include hardware resources that are managed by a full virtualization environment, a paravirtualization environment, and an operating system virtualization environment. In such an SDDC, a workload may be deployed to any of the virtualization environments.

FIG. 1 illustrates an example environment of use 100 including a software-defined data center (SDDC) 102 implemented in accordance with the teachings of this disclosure. The example SDDC 102 of the illustrated example of FIG. 1 includes core components 106, deployed servers 123, an operations manager 128, an automation manager 130, and a site recovery manager 132. An example administrator 146 and/or client 148 (e.g., a web browser, a web service, an application programming interface (API), a command line client (CLI), etc.) accesses the SDDC 102 via a network 150 (e.g., a public network, a private network, a virtual private network, etc.). In examples disclosed herein, the administrator 146 and the client 148 are implemented by computing devices executing interfaces that facilitate access to resources, services, etc., across the network 150. In certain examples, a load balancer (not shown) can route a plurality of clients 148 between a plurality of SDDC nodes 102. However, for purposes of simplicity, a single SDDC 102 is shown in the example of FIG. 1. Additional SDDC nodes 102 can be implemented according to the example of FIG. 1.

The example core components 106 of the illustrated example of FIG. 1 include a virtual environment infrastructure 108, an example network virtualizer 110, and an example virtual storage area network 112. The example virtual environment infrastructure 108 is a virtualization platform that includes an example hypervisor 114, an example services server 116, an example virtualization client 118, and an example virtual file system 120. In the illustrated example of FIG. 1, the virtual environment infrastructure 108 can be implemented using the vSphere virtualization suite developed and sold by VMware® of Palo Alto, California, United States. The example hypervisor 114 can be implemented using the VMware ESXi™ hypervisor developed and sold by VMware® The example services server 116 can be implemented using the VMware vCenter® Server developed and sold by VMware® The example virtualization client 118 can be implemented using the VMware vSphere® client developed and sold by VMware®. The example virtual file system 120 can be implemented using the VMware vSphere Virtual Machine File System developed and sold by VMware® Additionally or alternatively, some or all of the components of the virtual environment infrastructure 108 can be implemented using products, software, systems, hardware, etc. from companies other than VMware. In other examples, the virtual environment infrastructure 108 can include additional or different components other than those shown in FIG. 1.

The example network virtualizer 110 is a network virtualization platform that can be used to provide virtual network resources for network computing environments. The example network virtualizer 110 can be implemented using the VMware NSX® network virtualization platform developed and sold by VMware®. The example virtual storage area network 112 is a data storage virtualization platform that can be used to provide virtual data store resources for network computing environments. The example virtual storage area network 112 can be implemented using the VMware® Virtual SAN™ (vSAN) software-defined storage platform developed and sold by VMware®. Additionally or alternatively, the network virtualizer 110 and/or the virtual storage area network 112 can be implemented using products from companies other than VMware®.

In the illustrated example of FIG. 1, one or more VMs (or containers) are used to implement the deployed servers 123. In the illustrated example, the servers 123 include one or more example web servers 124a, one or more example app servers 124b, and one or more database (DB) servers 124c. The servers 123 are deployed and/or configured by one or more of an example operations manager 128, an example automation manager 130, and an example site recovery manager 132. The example operations manager 128 is provided to automate information technology (IT) operations management of the SDDC 102 to run the servers 123. The example operations manager 128 may be implemented using the VMware® vRealize® Operations (vROPS) IT Operations Management product developed and sold by VMware®. The example operations manager 128 is provided to automate responsive actions to business needs in real-time to deliver personalized infrastructure, applications, and IT operations when business needs arise within the SDDC 102. The example automation manager 130 can be implemented using the VMware's vRealize® Automation (vRA) product developed and sold by VMware®. The example site recovery manager 132 is provided to implement different levels of availability of the SDDC 102 for different servers 123. For example, some servers 123 may require higher levels of redundancy or network rerouting capabilities to ensure a higher level of availability for services (e.g., access to the servers 123 and/or underlying data) even during resource failures. In some examples, other, non-critical servers 123 may only require low to moderate availability. The example site recovery manager 132 can be implemented using the VMware® Site Recovery Manager Disaster Recovery Software developed and sold by VMware®.

Example approaches disclosed herein augment the functionality of the automation manager 130 to monitor for automation requests, manage provisioning of resources, applications, other code, etc., according to feature toggles that hide or make available functionality to client(s) 148 requesting provisioning of resources and/or other execution of SDDC 102 compute, storage, and/or network resources. Feature toggles enable step-by-step development of functionality (e.g., executable program code, application, other resource, etc.) without exposing unfinished or untested functionality to the client 148. Rather than requiring a code change to enable or disable functionality, a feature toggle can be used to test functionality, disable that functionality, and/or promote the functionality to a production release (e.g., made available for provisioning to the client 148, etc.).

In certain examples, functionality can be made available to some users but hidden from other users according to a feature toggle. As such, rather than being binary toggles applicable site-wide, a feature toggle can be tailored to a certain set or subset of clients 148 (e.g., to expose/hide a feature for a beta-test client 148, for certain tenant(s), etc.).

In addition to improving operation and flexibility of the SDDC 102, feature toggling can be stored in a database 126 (e.g., housed in one or more database server(s) 124c, etc.) rather than held in memory. By storing feature toggles in the database 126, a status or setting of a feature toggle (e.g., on/off, yes/no, tenant/global, etc.) can be changed during runtime (e.g., in response to a representational state transfer (REST) request, etc.) rather than requiring recoding or deployment of a code update. Toggles can be stored in the database 126 in a hierarchical structure according to tenant (e.g., organization, user, client, etc.), for example. Alternatively or in addition, toggles can be stored according to functionality/feature type, resource location, and/or other criterion, for example.

Figure 2:
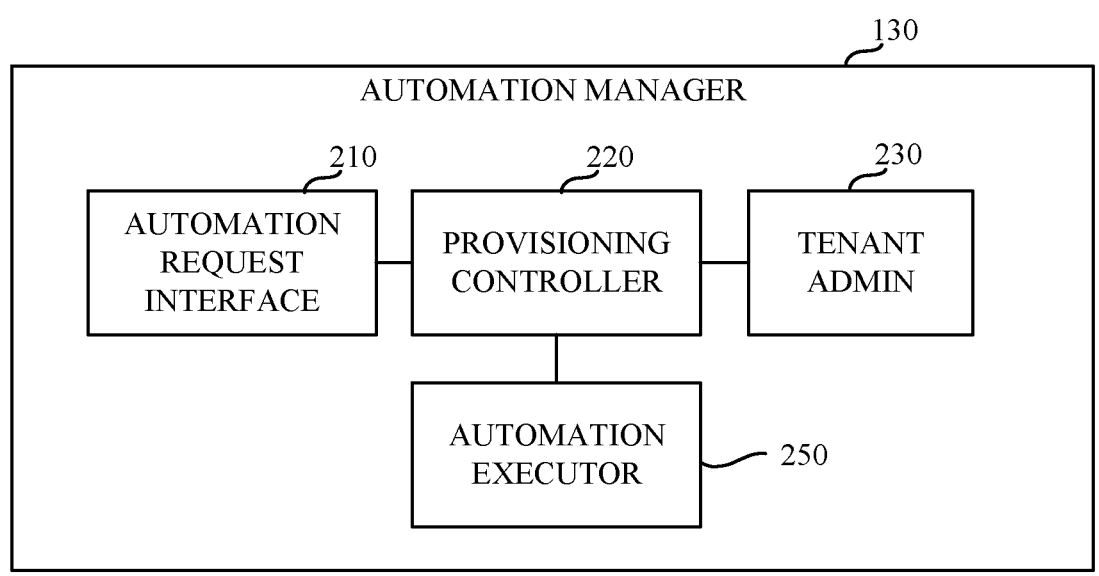
FIG. 2 is a block diagram of the example automation manager of the example SDDC of FIG. 1.

FIG. 2 is a block diagram of an example implementation of the automation manager 130 of FIG. 1. The example automation manager 130 of the illustrated example of FIG. 2 includes an example automation request interface 210, an example provisioning controller 220, an example tenant administrator 230, and an example automation executor 250. In operation, the example automation request interface 210 receives an automation request directed to the automation executor 250. The example provisioning controller 220 inspects the request and, if necessary, interacts with the example tenant administrator 230 to determine whether the automation request is applicable to a particular client 148, whether a tenant-specific version, rather than a global version, exists for the client 148, etc., before passing the automation request to the automation executor 250.

The example automation request interface 210 of the illustrated example of FIG. 2 enables users (e.g., administrators) to submit automation requests to the automation manager 130 for execution. In some examples, the automation request interface 210 is implemented as a user interface presented via a web page to the user. In some examples, such requests can be submitted via a programmatic interface such as, for example, an application programming interface (API), a REST interface, etc.

In examples disclosed herein, when the client 148 initiates a session with the automation request interface 210 (e.g., logs into the web page provided by the automation request interface 210 and/or otherwise submits a request from the client 148, etc.), the provisioning controller 220 facilitates provisioning of resources for execution via the automation executor 250. In examples disclosed herein, the automation request interface 210 passes the automation request to the provisioning controller 220. The automation executor 250 facilitates execution of the request using resources provisioned by the provisioning controller 220. The tenant administrator 230 processes and/or otherwise evaluates the request to determine whether particular organization-specific resources, settings, constraints, permissions, etc., should be applied for the requesting client 148.

The example provisioning controller 220 of the illustrated example of FIG. 2 is implemented by a logic circuit such as a hardware processor. However, any other type of circuitry can additionally or alternatively be used such as one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), Coarse Grained Reduced precision architecture (CGRA(s)), image signal processor(s) (ISP(s)), etc. However, in some examples, the provisioning controller 220 is implemented as a service of the automation manager 130.

The example tenant administrator 230 of the illustrated example of FIG. 2 analyzes a request from the provisioning controller 220 to identify a tenant, if applicable, and determine tenant-specific content, rules, resources, etc., for the request from the client 148. In certain examples, only global resources are provisioned, and the tenant administrator 230 is not present or is inactive. In other examples, the tenant administrator 230 identifies an applicable tenant and associated permission/restriction, other configuration, etc., associated with a request from the client 148.

Tenants, organizations, and/or other users (collectively referred to herein as tenants) can be organized according to a hierarchy, for example. A tenant is associated with a particular instantiation or configuration of resources such as the SDDC 102. As such, resource provisioning can proceed differently for different tenants. For example, a first tenant has a first configuration providing a first set of access to resources of the SDDC 102, and a second tenant has a second configuration providing a second set of access to resources of the SDDC 102.

In a default-tenant deployment, configuration occurs in a default tenant, and users log into the SDDC 102 via the client 148 and/or the administrator 146 (e.g., using a same universal resource locator (URL), other universal resource indicator (URI), etc.) and have features assigned to the respective user based on an associated role, for example. In a single-tenant deployment, a tenant is created for an organization to use an instance of the SDDC 102, for example. Tenant users access the instance of the SDDC 102 via the client 148 and/or the administrator 146 using a tenant-specific access point (e.g., a URL, other URI, etc.). In a multi-tenant deployment, a separate tenant is created for each organization that uses the instance of the SDDC 102, for example. Tenants access the SDDC 102 via the client 148 and/or the administrator 146 using tenant-specific access points (e.g., a URL, other URI, etc.). Each tenant is segregated from other tenants and from a default tenant, although a user such as an administrator with a system-wide role can view and manage configurations across tenants. Access to resources, functionality, and/or other features of the SDDC 102 can be configured according to the tenant, for example.

The example tenant administrator 230 of the illustrated example of FIG. 2 is implemented by a logic circuit such as a hardware processor. However, any other type of circuitry can additionally or alternatively be used such as one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), Coarse Grained Reduced precision architecture (CGRA(s)), image signal processor(s) (ISP(s)), etc. However, in some examples, the tenant administrator 230 is implemented as a service of the automation manager 130.

In the illustrated example of FIG. 2, the example tenant administrator 230 is implemented in a same automation manager 130 as the provisioning controller 220. However, in some examples, the tenant administrator 230 can be implemented in a separate automation manager from the provisioning controller 220. That is, the provisioning controller 220 and the tenant administrator 230 can be implemented in separate containers, separate virtual machines, etc.

The example automation executor 250 of the illustrated example of FIG. 2 executes automation instructions included in the automation request received via the automation request interface 210. Such automation instructions can result in, for example, the provisioning of a virtual host, installation of an operating system on the virtual host, configuration of an application for execution on the operating system, etc. Each of such operations can be authorized in the context of a user session that is initialized based on a user (e.g., an administrator) providing their credentials.

The example automation executor 250 of the illustrated example of FIG. 2 is implemented by a logic circuit such as a hardware processor. However, any other type of circuitry can additionally or alternatively be used such as one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), Coarse Grained Reduced precision architecture (CGRA(s)), image signal processor(s) (ISP(s)), etc. However, in some examples, the automation executor 250 is implemented as a service of the automation manager 130.

Figure 3:
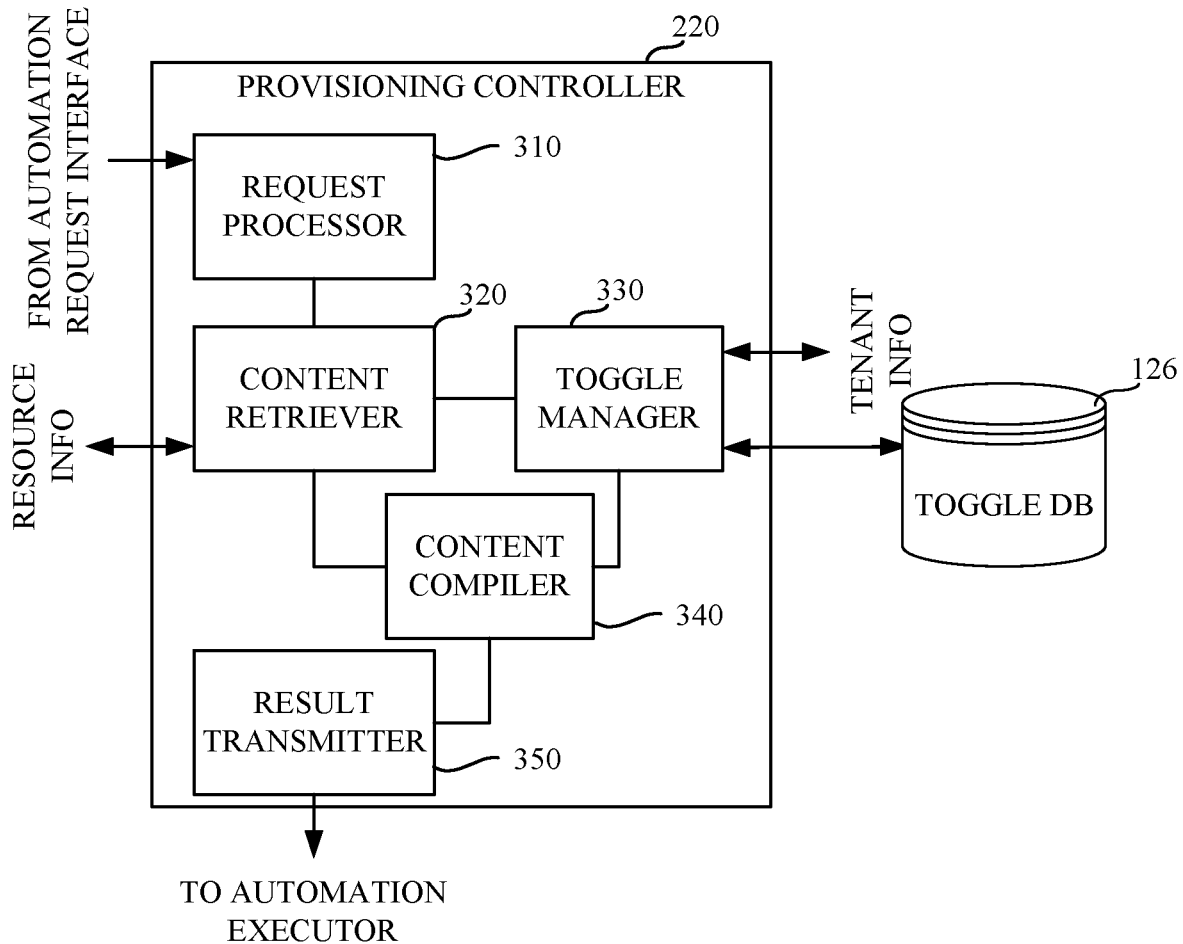
FIG. 3 is a block diagram of the example provisioning controller of FIG. 2.

FIG. 3 is a block diagram of an example implementation of the provisioning controller 220 of FIG. 2. The example provisioning controller 220 includes an example request processor 310, an example content retriever 320, an example toggle manager 330, an example content compiler 340, and an example request transmitter 350.

In operation, the example provisioning controller 220 receives a request for provisioning of a cloud resource(s) of the example SDDC 102 (e.g., an automation request from the client 148, the administrator 146, etc.). For example, the request includes provisioning of a Web service to provide a form and/or other interface to the client 148. The example provisioning controller 220 evaluates the received request to identify and/or retrieve toggle(s) associated with the requested resource(s). The example provisioning controller 220 determines whether a particular tenancy (e.g., a division or difference in configuration and/or available functionality, etc., between clients 148, etc.) affects feature toggling and/or other provisioning of a service, interface, and/or other resource of the SDDC 102, for example. The provisioning controller 220 then provides the processed provisioning request results to the automation executor 250 to execute the provisioned resource(s) for the client 148.

The example request processor 310 of the illustrated example of FIG. 3 processes a request received via the example automation request interface 210 of FIG. 2 to automatically provision one or more cloud resources. In certain examples, the automation request includes a resource identification, a function call, a service request (e.g., a GET request), etc. The example request processor 310 parses the request to identify the requesting client 148, a target of the request, and at least one resource included in the request for provisioning, for example.

In response to the provisioning request, the example content retriever 320 uses the information extracted from the request by the request processor 310 to request the provisioned resource(s) for configuration, allocation, and/or deployment for the requesting client 148. For example, Web page/form content, a container/virtual machine, an application, etc., is requested by the content retriever 320. Alternatively or in addition, the content retriever 320 formats a request for content, application, other resource, for execution by the automation executor 250.

The example content retriever 320 also interacts with the example toggle manager 330. The example toggle manager 330 processes information extracted by the example request processor 310 and/or the example content retriever 320 from the provisioning request to determine whether any feature toggle(s) apply to the requested resource(s). For example, the requesting client 148, a target of the request, and at least one resource included in the request for provisioning can form one or more keys to be used by the example toggle manager 330 to form a toggle query of the database 126 to retrieve feature toggle(s) and/or toggle-related information (e.g., toggle identifier(s), a toggle profile, etc.) from the database 126.

In operation, the example toggle manager 330 queries the example database 126 using one or more keys to retrieve (e.g., using a GET command, etc.) one or more feature toggles applicable to a particular user/client/tenant, a particular resource request, etc. In certain examples, the feature toggle query can be tenant-based, and tenant information from the tenant administrator 230 is used by the example toggle manager 330 to interrogate the database 126. For example, the example SDDC 102 can be assigned to a single tenant and/or the SDDC 102 can include resources divided among multiple tenants. In a tenant-based or tenant-aware configuration, one or more feature toggles can be associated with only a subset of tenants, can have different values for different tenants, etc.

For example, both global and tenant-specific feature toggles can be stored in the example database 126. Features/functionality can be set as a tenant-specific toggle at a first point in time (e.g., for feature testing, feature validation, limited feature deployment, premium feature deployment, etc.), and that functionality can become a globally-toggled feature available to multiple users/clients at a second time, for example. A feature can be enabled with a global toggle, and an improvement, customization, and/or other modification of the feature can become a tenanted feature toggle, for example.

If a client/user 148 (and/or its associated provisioning service) requests all toggles in a provisioning request to the provisioning controller 220 processed by the toggle manager 330, toggles specific to a tenant/organization associated with that client/user 148 override global toggles having a same key. That is, the toggles can be organized according to a hierarchy and/or other tenant-based organizational structure in the database 126 such that a global or general toggle is used unless the particular tenant has a specific variant for that toggle, in which case the tenant-specific toggle is used instead of the global toggle and/or modifies one or more values/aspects of the global toggle, etc. In certain examples, a get request executed using a system user token (e.g., a persistent or time-limited identifier of an administrator or other system-level user and/or associated system-level session, etc.) returns all applicable toggles stored in the database 126 without overrides.

In certain examples, in addition to using tenant information to form a toggle query of the example database 126, the example toggle manager 330 also includes a processing strategy for the toggle(s) to be retrieved from the example database 126. For example, the selected processing strategy modifies how the toggle data is formatted/structured for a requesting service. In some examples, toggle(s) are returned to the toggle manager 330 from the example database 126 as objects from a provisioning service. In other examples, toggle(s) are returned to the toggle manager 330 from the example database 126 as a micro-service and/or hybrid cloud object (e.g., a Symphony™ object, etc.). As such, the toggle manager 330 can provide toggle(s) in a variety of formats to accommodate a requesting service. The requesting service need not convert the toggle information. Instead, the toggle manager 330 acts as a single point to manage toggles stored in the database 126 (e.g., on one or distributed across multiple database servers 124c, etc.).

Toggle(s) returned by the example toggle manager 330 are provided to the example content compiler 340. The example content compiler 340 compiles and/or otherwise assembles information for provisioning of resource(s) including feature toggle(s) in response to the received request. For example, in response to a get toggles request, the content compiler 340 compiles a set of retrieved global and/or tenant-specific toggles to be provided to the requesting service. In response to another type of provisioning request or content query, the content compiler 340 compiles information (e.g., information for provisioning of a resource such as a webpage, container, virtual machine, etc.), including retrieved global and/or tenant-specific toggles for execution by the automation executor 250, for example.

The example result transmitter 350 provides the resulting compiled information (e.g., a set of feature toggles, content include feature toggles, etc.) from the example content compiler 340 to the example automation executor 250. For example, the result transmitter 350 provides a service to transfer content (e.g., retrieved toggle(s) and/or resource content, etc.) to the automation executor 250 to instantiate, deploy, and/or otherwise execute resource(s) for the requester (e.g., the client 148, the administrator 146, etc.).

The example request processor 310, the example content retriever 320, the example toggle manager 330, the example content compiler 340, and/or the example request transmitter 350 of the illustrated example of FIG. 3 is/are implemented by a logic circuit such as a hardware processor. However, any other type of circuitry can additionally or alternatively be used such as one or more analog or digital circuit(s), logic circuits, programmable processor(s), ASIC(s), PLD(s), FPLD(s), programmable controller(s), GPU(s), DSP(s), CGRA(s), ISP(s), etc. In some examples, the example request interceptor 310, the example request processor 310, the example content retriever 320, the example toggle manager 330, the example content compiler 340, and/or the example request transmitter 350 are implemented by separate logic circuits. In some examples, the example request processor 310 implements means for accessing. In some examples, the example content retriever 320 implements means for retrieving. In some examples, the example toggle manager 330 implements means for managing. In some examples, the example content compiler 340 implements means for combining. In some examples, the example request transmitter 350 implements means for sending.

Figure 4:
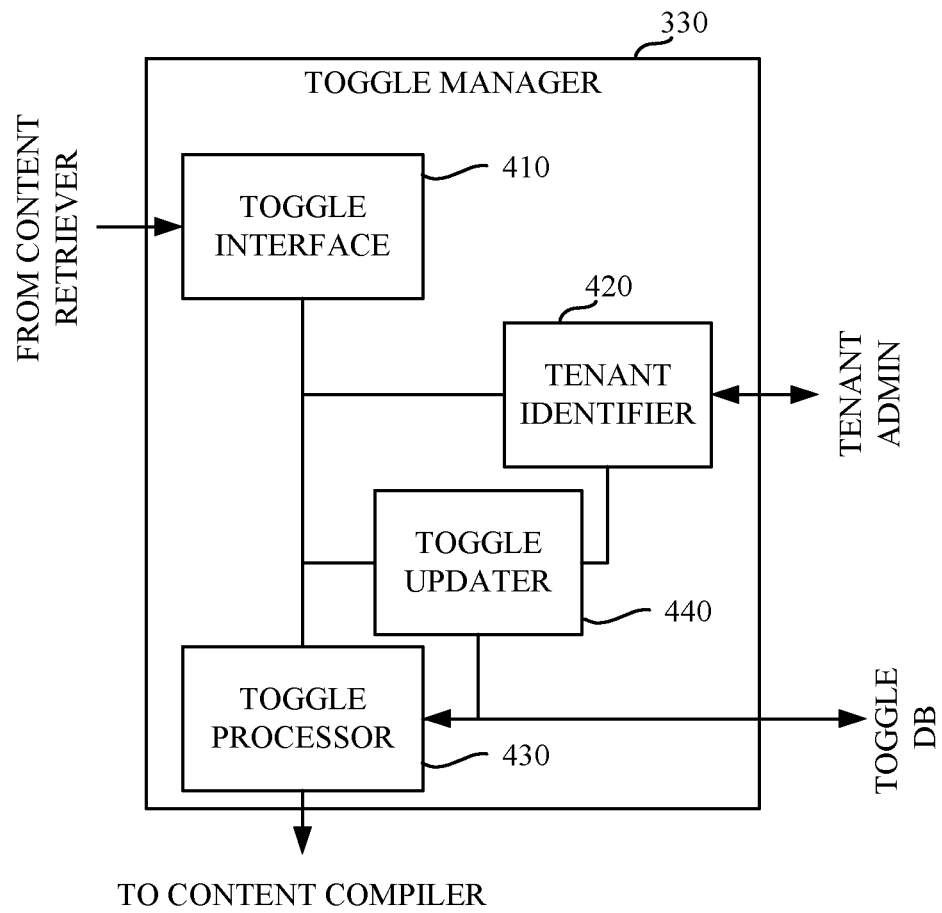
FIG. 4 is a block diagram of the example toggle controller of FIG. 3.

FIG. 4 is a block diagram of an example implementation of the toggle manager 330 of FIG. 3. The example toggle manager 330 of FIG. 4 includes an example toggle interface 410, an example tenant identifier 420, an example toggle processor 430, and an example toggle updater 440.

The example toggle interface 410 receives a trigger and/or other request from the example content retriever 320. The example toggle interface 410 processes the request for one or more feature toggles from the example content retriever 320. The example toggle interface 410 can identify whether the request is a request to get all toggles, a request to get a certain tenant's toggle(s), a request for another subset of toggle(s), a request for content and/or other provisioning including toggle(s), etc. The example toggle interface 410 parses the request to extract information corresponding to tasks to be handled by the example toggle manager 330.

The example tenant identifier 420 of the example of FIG. 4 interacts with the example tenant administrator 230 to identify a tenant associated with a provisioning request received by the example request processor 310 of the example provisioning controller 220. The example tenant identifier 420 can provide tenant identification information, such as a tenant type, tenant identification (ID) number, tenant name, tenant hierarchy, other organization information, etc., to form a query or request by the toggle processor 430 to the toggle database 126. For example, the example tenant identifier 420 queries the example tenant administrator 230, which returns the tenant identification information to the example tenant identifier 420 based on an identity of the client 148 and/or administrator 146, session information, system configuration, login information, other information from the example toggle interface 410, etc. The example tenant identifier 420 passes the tenant identification information along to the example toggle processor 430.

The example toggle processor 430 assembles a query and/or other request to the example toggle database 126. The example toggle processor 430 takes the tenant identification from the example tenant identifier 420 and request information from the example toggle interface 410 to generate a query, request, and/or other access of the example toggle database 126. The example toggle processor 430 sends the query to the example toggle database 126 and receives a response to the query from the example toggle database 126. The example toggle processor 430 provides the query result from the example toggle database 126 to the example content compiler 340.

In certain examples, the example toggle interface 410 receives a toggle update request or instruction to update toggle(s) in the example toggle database 126. The example toggle interface 410 provides the update request/instruction to the example toggle updater 440. The toggle update request/instruction can add and/or remove toggles for one or more tenants (e.g., globally, tenant-specific, etc.) to/from the example toggle database 126, for example. The toggle update request/instruction can adjust a toggle value, update program code and/or other feature associated with a toggle, etc., for one or more tenants (e.g., globally, tenant-specific, etc.) in the example toggle database 126, for example. As such, a request and/or other instruction from the example toggle updater 440 adjusts (e.g., via a REST command, etc.) toggle-related content of the example toggle database 126, for example.

The example toggle interface 410, the example tenant identifier 420, the example toggle processor 430, and/or the example toggle updater 440 of the illustrated example of FIG. 4 is/are implemented by a logic circuit such as a hardware processor. However, any other type of circuitry can additionally or alternatively be used such as one or more analog or digital circuit(s), logic circuits, programmable processor(s), ASIC(s), PLD(s), FPLD(s), programmable controller(s), GPU(s), DSP(s), CGRA(s), ISP(s), etc. In some examples, the example toggle interface 410, the example tenant identifier 420, the example toggle processor 430, and/or the example toggle updater 440 are implemented by separate logic circuits. In some examples, the example toggle interface 410 implements means for analyzing. In some examples, the example tenant identifier 420 implements means for identifying. In some examples, the example toggle processor 430 implements means for retrieving and means for processing. In some example, the example toggle updater 430 implements means for updating.

Figure 5:
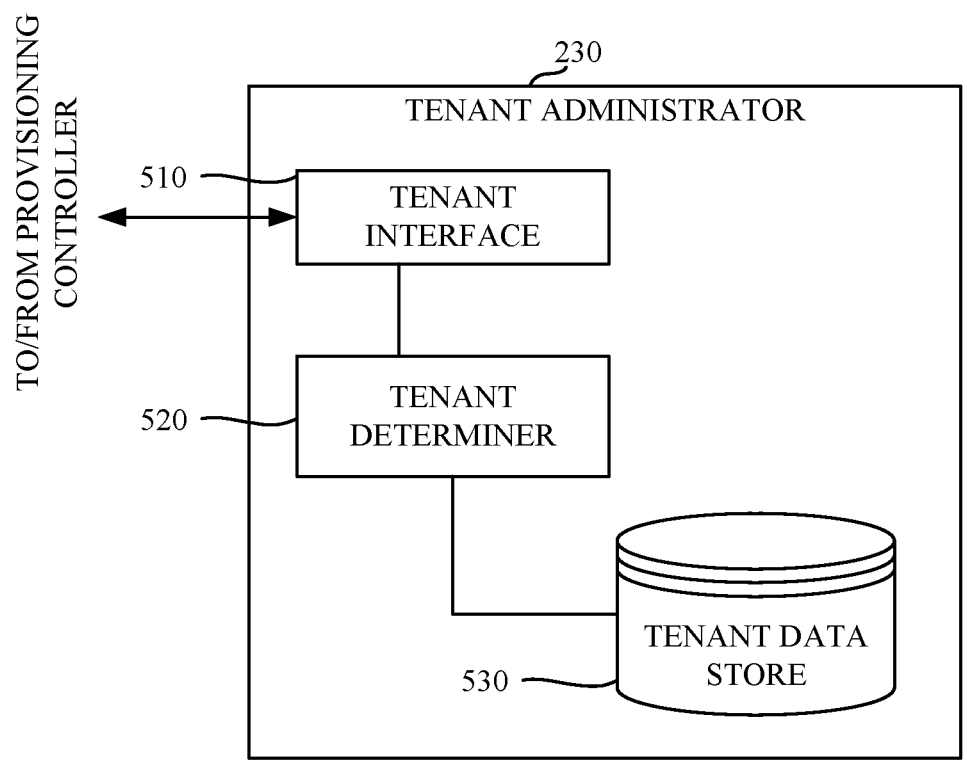
FIG. 5 is a block diagram of the example tenant administrator of FIG. 2

FIG. 5 is a block diagram of an example implementation of the tenant administrator 230 of FIG. 2. The example tenant administrator 230 of FIG. 5 includes an example tenant interface 510, an example tenant determiner 520, and an example tenant data store 530.

The example tenant interface 510 of the example of FIG. 5 receives a request from the example tenant identifier 420 to identify a tenant associated with a provisioning request received by the example request processor 310 of the example provisioning controller 220. The example tenant interface 510 can provide tenant identification information, such as a tenant type, tenant identification (ID) number, tenant name, tenant hierarchy, other organization information, etc., to the example tenant identifier 420. For example, the example tenant identifier 420 queries the example tenant interface 510 of the example tenant administrator 230. The example tenant interface 510 queries the tenant determiner 520, which returns tenant identification information based on a lookup of the example tenant data store 530. The example tenant determiner 520 queries the example tenant data store 530 based on an identity of the client 148 and/or administrator 146, session information, system configuration, login information, other information from the example toggle interface 410, etc. The example tenant determiner 520 returns the tenant identification information to the example tenant interface 510. The example tenant interface 510 provides the tenant identification information to the requesting tenant identifier 420, for example.

The example tenant interface 510, the example tenant determiner 520, and/or the example tenant data store 530 of the illustrated example of FIG. 5 is/are implemented by a logic circuit such as a hardware processor. However, any other type of circuitry can additionally or alternatively be used such as one or more analog or digital circuit(s), logic circuits, programmable processor(s), ASIC(s), PLD(s), FPLD(s), programmable controller(s), GPU(s), DSP(s), CGRA(s), ISP(s), etc. In some examples, the example tenant interface 510, the example tenant determiner 520, and/or the example tenant data store 530 are implemented by separate logic circuits. In some examples, the example tenant interface 410 implements means for receiving. In some examples, the example tenant determiner 520 implements means for determining.

Figure 6:
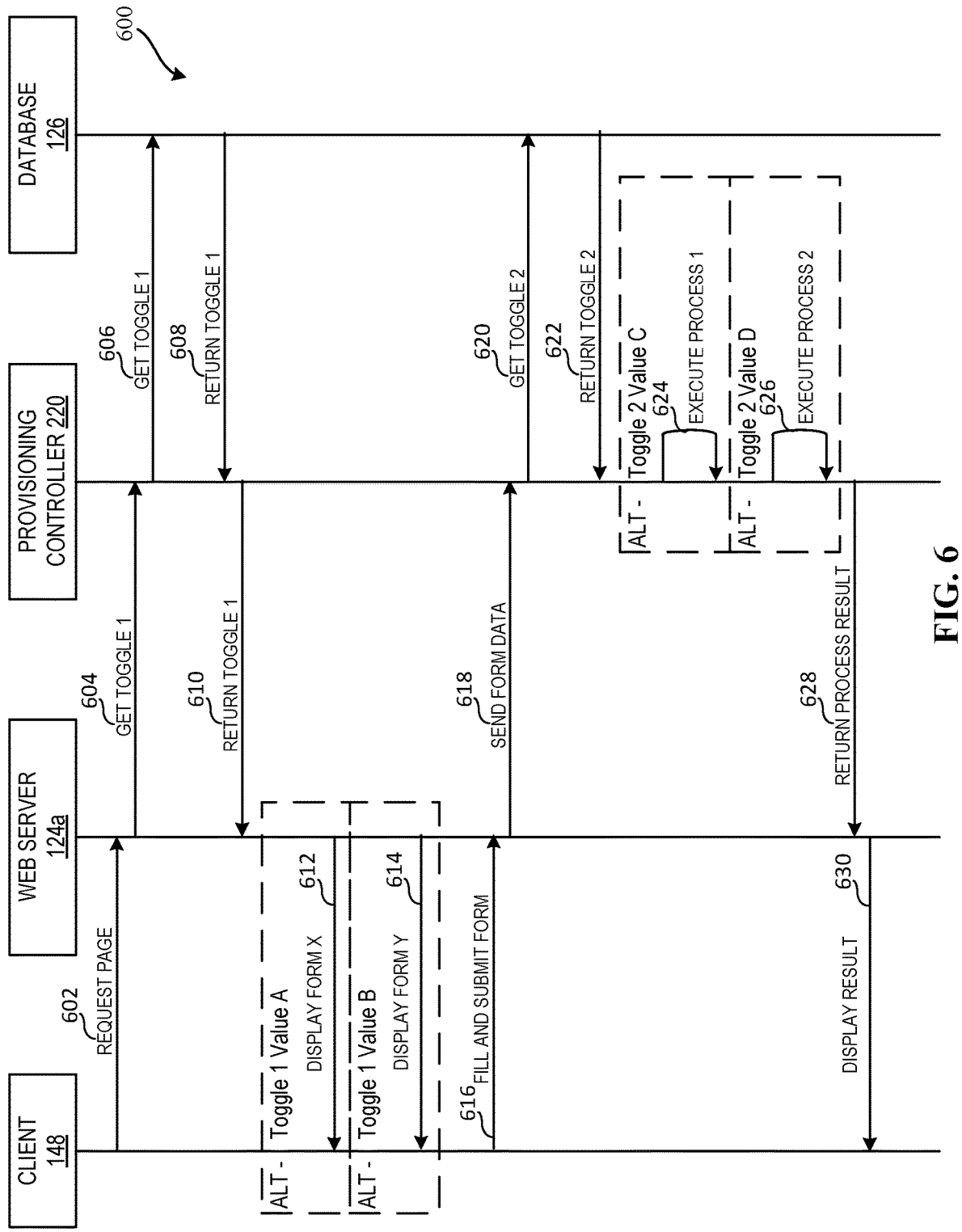
FIG. 6 is a data flow diagram of an example interaction between an example client, an example web server, an example provisioning controller, and an example feature toggle database.

FIG. 6 is a data flow diagram 600 showing an example interaction between the example client 148, the example web server 124a, the example provisioning controller 220, and the example toggle database 126 to provide web page content to the client 148 in response to a provisioning request. As shown in the example of FIG. 6, a web page is requested 602 by the client 148 from the example web server 124a. The example web server 124a responds to the request 602 with a request or "get" action 604 for an associated first toggle from the example provisioning controller 220. For example, the web server 124a, which will construct the web page content for the client 148, identifies an indicator of tenant-specific content which triggers the get toggle request. Alternatively or in addition, the example web server 124a does not identify an indicator of tenant-specific content but queries the example provisioning controller 220 to determine whether any feature toggle exists to be included in the web page content being provisioned by the web server 124a for the client 148, for example.

The example provisioning controller 220 retrieves and/or otherwise gets 606 the first toggle from the example toggle database 126. The example toggle database 126 returns 608 the first toggle to the provisioning controller 220. For example, the example toggle database 126 returns program code associated with a first feature actionable by a first tenant associated with the example client 148 to be included in the web page content being provisioned by the example web server 124a. The example provisioning controller 220 provides 610 the first toggle to the example web server 124a.

Based on the value of the first toggle, the example web server 124a displays a form X 612 or a form Y 614 to the client 148. For example, when the first toggle has a value A, the web server 124a renders form X 612 including toggle content A for the client 148, and, when the first toggle has a value B, the web server 124a renders form Y 614 including toggle content B for the client 148.

The example client 148 interacts with the generated form A or B to fill in the form and submit the form 616 back to the example web server 124a. The example web server 124a routes the form data 618 to the example provisioning controller 220. The example provisioning controller 220 processes the form data and, based on the form data, requests 620 a second toggle from the example toggle database 126.

The example toggle database 126 returns 622 the second toggle to the provisioning controller 220. For example, the example toggle database 126 returns program code associated with a second feature actionable by the first tenant associated with the example client 148. The example provisioning controller 220 processes the second toggle and executes a first process 624 or a second process 626 based on the value of the second toggle. For example, when the second toggle has a value C, then the example provisioning controller 220 executes the first process 624. When the second toggle has a value D, then the example provisioning controller 220 executes the second process 626.

The example provisioning controller 220 returns 628 a result of the execution of the first process or the second process to the example web server 124. The example web server 124a displays the result 630 to the example client 148. As such, for example, the web server 124a provides different content/functionality/etc. to the client 148 based on the second toggle provided to the provisioning controller 220 from the toggle database 126.

While an example implementation of the provisioning controller 220 of FIG. 2 is illustrated in FIG. 3, an example implementation of the toggle manager 330 of FIG. 3 is illustrated in FIG. 4, and an example implementation of the tenant administrator 230 of FIG. 2 is illustrated in FIG. 5, one or more of the elements, processes and/or devices illustrated in FIGS. 2, 3, 4, and/or 5 can be combined, divided, re-arranged, omitted, eliminated and/or implemented in any other way. Further, the example request processor 310, the example content retriever 320, the example user toggle manager 330, the example content compiler 340, the example result transmitter 350, and/or, more generally, the example provisioning controller 220 of FIGS. 2 and/or 3; the example toggle interface 410, the example tenant identifier 420, the example toggle processor 430, the example toggle updater 440, and/or, more generally, the example toggle manager 330 of FIGS. 3 and/or 4; the example tenant interface 510, the example tenant determiner 520, the example tenant data store 530, and/or more generally, the example tenant administrator of FIGS. 2 and/or 5 can be implemented by hardware, software, firmware and/or any combination of hardware, software and/or firmware. Thus, for example, any of the example request processor 310, the example content retriever 320, the example user toggle manager 330, the example content compiler 340, the example result transmitter 350, and/or, more generally, the example provisioning controller 220 of FIGS. 2 and/or 3; the example toggle interface 410, the example tenant identifier 420, the example toggle processor 430, the example toggle updater 440, and/or, more generally, the example toggle manager 330 of FIGS. 3 and/or 4; the example tenant interface 510, the example tenant determiner 520, the example tenant data store 530, and/or more generally, the example tenant administrator of FIGS. 2 and/or 5 can be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example request processor 310, the example content retriever 320, the example user toggle manager 330, the example content compiler 340, the example result transmitter 350, and/or, more generally, the example provisioning controller 220 of FIGS. 2 and/or 3; the example toggle interface 410, the example tenant identifier 420, the example toggle processor 430, the example toggle updater 440, and/or, more generally, the example toggle manager 330 of FIGS. 3 and/or 4; the example tenant interface 510, the example tenant determiner 520, the example tenant data store 530, and/or more generally, the example tenant administrator of FIGS. 2 and/or 5 is/are hereby expressly defined to include a non-transitory computer readable storage device or storage disk such as a memory, a digital versatile disk (DVD), a compact disk (CD), a Blu-ray disk, etc. including the software and/or firmware. Further still, the example provisioning controller 220 of FIGS. 2, 3, and/or 4, and/or the example tenant administrator 230 of FIGS. 2 and/or 5 can include one or more elements, processes and/or devices in addition to, or instead of, those illustrated in FIGS. 2, 3, 4, and/or 5, and/or can include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7:
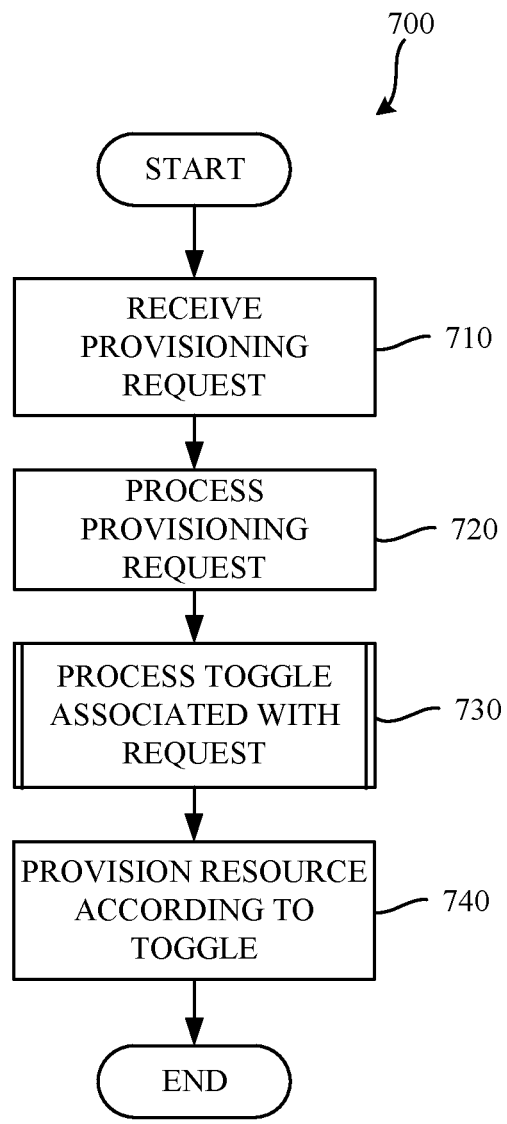
FIGS. 7-9 are flowcharts representative of example machine-readable instructions that can be executed to implement all or part of the example provisioning controller of FIGS. 2, 3, and/or 4.
Figure 8:
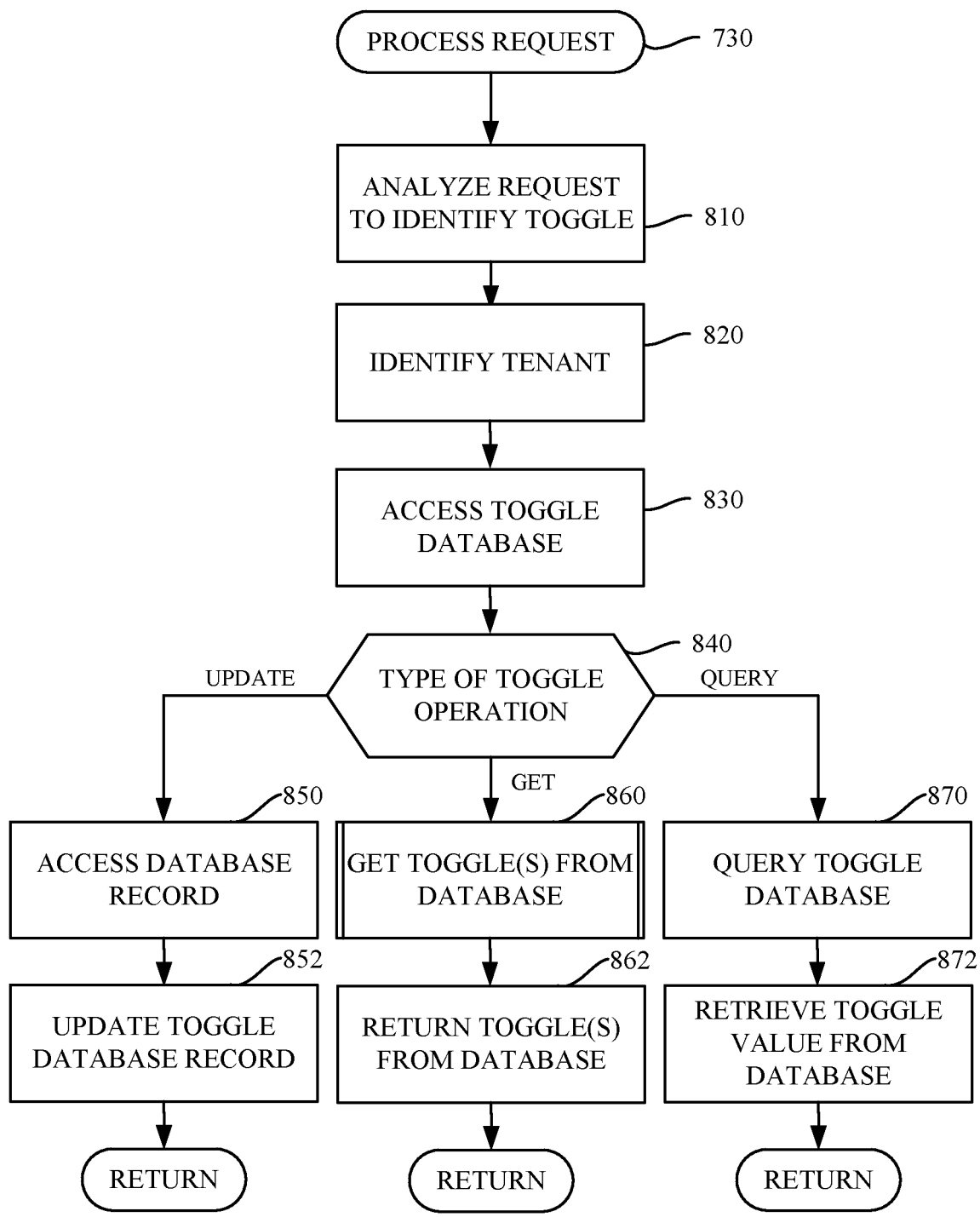
Figure 9:
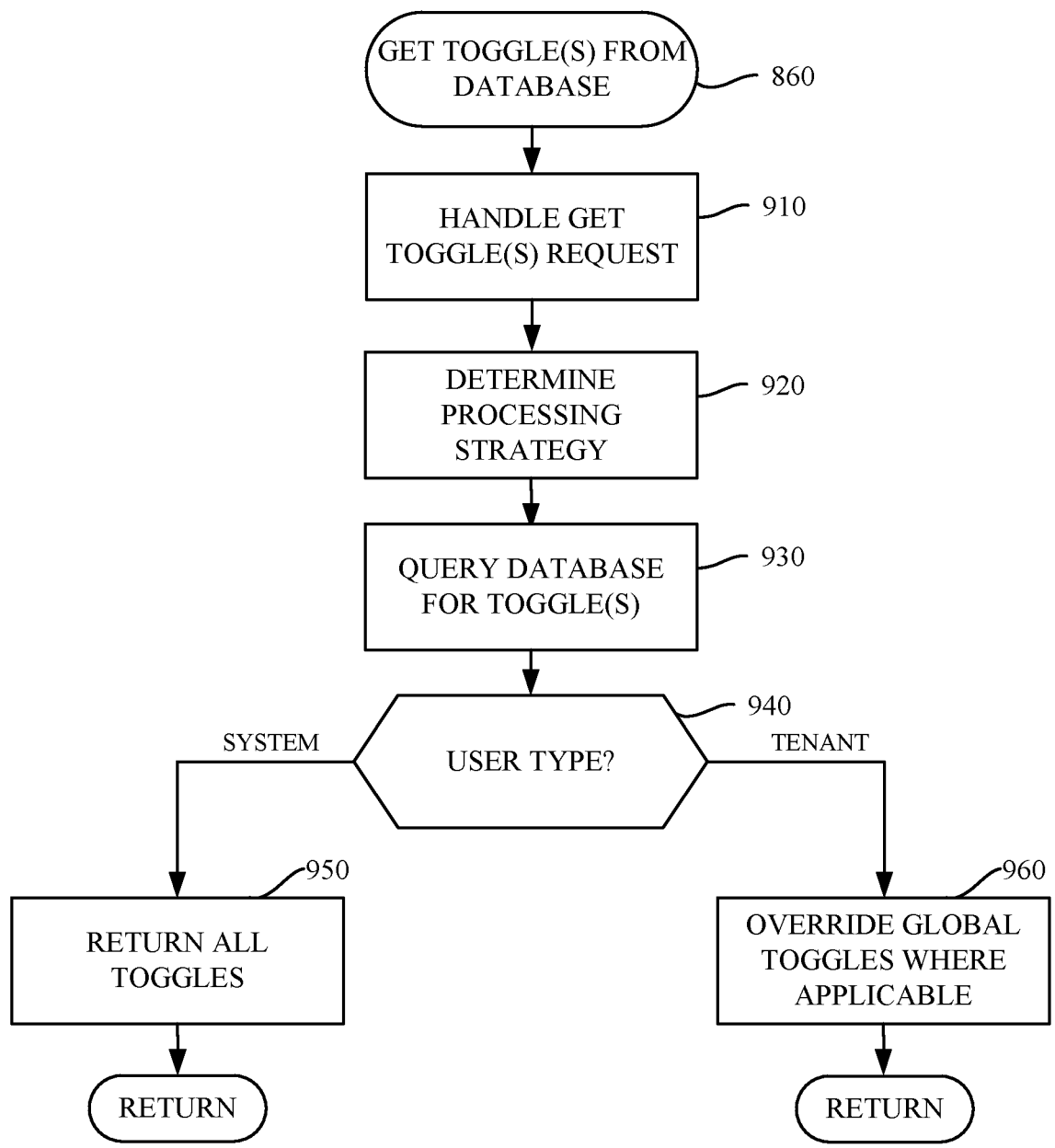

Flowcharts representative of example hardware logic, machine readable instructions, hardware implemented state machines, and/or any combination thereof for implementing the provisioning controller 220 of FIGS. 2, 3, and/or 4 is shown in FIGS. 7-9. The machine readable instructions can be one or more executable programs or portion(s) of an executable program for execution by a computer processor and/or processor circuitry, such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 7-9, many other methods of implementing the example provisioning controller 220 can alternatively be used. For example, the order of execution of the blocks can be changed, and/or some of the blocks described can be changed, eliminated, or combined. Additionally or alternatively, any or all of the blocks can be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry can be distributed in different network locations and/or local to one or more devices (e.g., a multi-core processor in a single machine, multiple processors distributed across a server rack, etc.).

The machine readable instructions described herein can be stored in one or more of a compressed format, an encrypted format, a fragmented format, a compiled format, an executable format, a packaged format, etc. Machine readable instructions as described herein can be stored as data or a data structure (e.g., portions of instructions, code, representations of code, etc.) that may be utilized to create, manufacture, and/or produce machine executable instructions. For example, the machine readable instructions can be fragmented and stored on one or more storage devices and/or computing devices (e.g., servers) located at the same or different locations of a network or collection of networks (e.g., in the cloud, in edge devices, etc.). The machine readable instructions may involve one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions can be stored in multiple parts, which are individually compressed, encrypted, and stored on separate computing devices, wherein the parts when decrypted, decompressed, and combined form a set of executable instructions that implement one or more functions that can together form a program such as that described herein.

In another example, the machine readable instructions can be stored in a state in which they can be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 7, 8, and/or 9 can be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 7 is a flowchart representative of example machine-readable instructions that can be executed to implement the example provisioning controller 220 of FIGS. 2 and/or 3. The example process 700 of the illustrated example of FIG. 7 begins when the example request processor 310 (FIG. 3) receives a provisioning request via the example automation request interface 210 of FIG. 2. (Block 710). For example, the request processor 310 receives a request via a first service (e.g., a REST service, a Web service, and/or other software service to perform an automated task, respond to a hardware event, or listen for a data request, etc.) to provision a virtual machine, an HTML or other Web-based resource, etc. The example request processor 310 processes the provisioning request. (Block 720). For example, the request processor 310 processes the provisioning request to identify one or more feature toggles included in and/or otherwise associated with the provisioning request (e.g., in the request, associated with the request client 148 and/or other tenant, associated with the resource(s) to be provisioned, etc.).

The example toggle manager 330 (FIG. 3) processes the identified feature toggle(s) associated with the provisioning request. (Block 730). In certain examples, the toggle manager 330 uses a second service (e.g., a REST service, a Web service, and/or other software service to perform an automated task, respond to a hardware event, or listen for a data request, etc.) to process the feature toggle(s) with respect to the example toggle database 126 (FIGS. 1 and 3).

For example, the toggle manager 330 identifies one or more feature toggle(s) to be updated in the example toggle database 126 and updates the toggle database 126. As another example, the example toggle manager 330 forms a GET request and/or other query to retrieve applicable feature toggle(s) from the example toggle database 126 and executes the request with respect to the database 126 to retrieve available toggle(s) (e.g., global toggle(s) and/or tenant-specific toggle(s) that preempt one or more global toggles, etc.). Alternatively or in addition, the example toggle manager 330 identifies one or more feature toggle(s) indicated in the provisioning request for which values are to be retrieved from the example toggle database 126. For example, the toggle manager 330 identifies a flag, hook, reference, variable, parameter, and/or other indicator associated with a feature toggle in the provisioning request and queries the toggle database 126 to retrieve such feature toggle value(s). Example instructions that can be used to implement block 730 are described below in connection with FIG. 8.

The example content retriever 320, content compiler 340, and result transmitter 350 (FIG. 3) facilitate provisioning of resource(s) according to the feature toggle(s) and provisioning request. (Block 740). For example, the example content retriever 320 (FIG. 3) retrieves resource content associated with the provisioning request and/or information identifying resource content associated with the provisioning request that can be used by the example automation executor 250 (FIG. 2) to provision resource(s). The example content compiler 340 compiles the retrieved resource(s)/resource information with feature toggle value(s) from the example toggle manager 330 to form an output for the example result transmitter 350 to provide to the example automation executor 250 (e.g., to enable provisioning of a virtual machine, container, Web page, application, etc., for a client 148, administrator 146, etc.). In certain examples, the content compiler 340 uses a third service (e.g., a REST service, a Web service, and/or other software service to perform an automated task, respond to a hardware event, or listen for a data request, etc.) to combine resource information with feature toggle content to form a provisioning output for the example result transmitter 350 to provide to the example automation executor 250 for execution.

The example process 700 of the illustrated example of FIG. 7 then terminates but may be repeated in response to a subsequent provisioning request.

FIG. 8 is a flowchart providing further example detail regarding processing a toggle associated with a provisioning request (Block 730 of the example of FIG. 7), representative of example machine readable instructions that can be executed to implement the example toggle manager 330 of FIGS. 3 and/or 4. The example process 730 of FIG. 8 begins when a provisioning request is analyzed by the example toggle interface 410 (FIG. 4) to identify a feature toggle and/or reference to a feature toggle in the provisioning request. (Block 810). For example, a request to provision HTML content is analyzed by the example toggle retriever 410 to identify an indicator of a feature toggle (e.g., a flag, hook, reference, variable, parameter, and/or other indicator associated with a feature toggle in the provisioning request, etc.). Alternatively or in addition, the provisioning request is associated with a general query for feature toggles (e.g., global feature toggle(s) and/or tenant-specific feature toggle(s)) associated with the provisioning request, a target resource of the provisioning request, a requesting tenant, etc. Alternatively or in addition, the provisioning request may be or include an update to a feature toggle in the example toggle database 126 (e.g., adding a new feature toggle, updating an existing feature toggle, etc.).

The example tenant identifier 420 (FIG. 4) identifies a tenant associated with the provisioning request and/or the administrator 146/client 148 accessing the SDDC 102. (Block 820). For example, the tenant identifier 420 retrieves a tenant identification from the provisioning request and/or from a configuration, setting, profile, etc., of the client 148, administrator 146, and/or other entity logged into or otherwise accessing the SDDC 102 to make/trigger the provisioning request. The tenant identification can be associated with a user and/or session token, for example.

The example toggle processor 430 (FIG. 4) accesses the example toggle database 126. (Block 830). Based on a type of toggle operation (e.g., get, query, update, etc.), a next action is triggered by the example toggle processor 430. (Block 840). For example, when the operation is an update operation, then the example toggle updater 440 (FIG. 4) accesses a feature toggle record in the example toggle database 126 (FIGS. 1 and 3). (Block 850). The example toggle updater 440 updates the toggle record in the example database 126 with a new feature toggle record, an updated feature toggle record, etc. (Block 852).

When the example toggle operation is a get toggle(s) operation, then the example toggle processor 430 gets one or more applicable toggle(s) from the example toggle database 126. (Block 860). For example, toggle(s) can be retrieved from the database 126 based on resource, request, tenant, etc. Example instructions that can be used to implement block 860 are described below in connection with FIG. 9. The example toggle processor 430 returns feature toggle(s) from the example toggle database 126 to the example content compiler 340. (Block 862).

When the example toggle operation is a query for a particular feature toggle or set of feature toggles, then the example toggle processor 430 queries the example toggle database 126 for the requested feature toggle(s). (Block 870). The example toggle processor 430 retrieves toggle value(s) from the example toggle database 126. (Block 872). For example, the toggle processor 430 retrieves and returns content, program code, parameter, etc., associated with the requested feature toggle(s) to the example content compiler 340.

The example process 730 the illustrated example of FIG. 8 then terminates but can be repeated, for example, upon a subsequent request to be processed. In the illustrated example, control returns to the example instructions of FIG. 7.

FIG. 9 is a flowchart providing further example detail regarding getting feature toggle(s) from the example toggle database 126 (Block 860 of the example of FIG. 8), representative of example machine readable instructions that can be executed to implement the example toggle processor 430 of FIG. 4. The example process 860 of FIG. 9 begins when a feature toggle get request (e.g., a REST GET request and/or other query, etc.) is submitted. The example toggle processor 430 handles the get toggle(s) request. (Block 910). In certain examples, the toggle processor 430 determines a processing strategy for the get request. (Block 920). For example, the selected processing strategy indicates how the feature toggle data appears or is to be provided to the provisioning service (e.g., what information, in what format, level of detail, etc.).

In certain examples, two processing strategies can be provided by a provisioning service and/or a toggling service to return a result body in response to a toggle get request. The processing strategy can be selected based on a requesting service so that the requesting service does not have to change or adjust the returned toggle result content. For example, a first processing strategy returns a toggle represented as a provisioning service object. A second processing strategy returns a toggle as a micro-service and/or hybrid cloud object, for example.

The example toggle processor 430 then queries the example toggle database 126 (FIGS. 1 and 3) for feature toggle(s). (Block 930). The example toggle processor 430 determines a user type associated with the query. (Block 940). For example, the example toggle processor 430 determines whether the query is associated with a system/global user (e.g., the administrator 146, a super user, etc.) or a particular tenant (e.g., an organization, a user, etc.). When the query is associated with a system user, then all feature toggles are returned from the toggle database 126 in response to the query. (Block 950). When the query is associated with a particular tenant, then global toggles are overridden with particular tenant toggles where applicable. (Block 960).

For example, Toggle 1 has a global value of "A" and tenant-specific values "B" and "C". Tenant value B is associated with a Tenant 1, and tenant value C is associated with a Tenant 2. When Tenant 1 requests the value of Toggle 1, the tenant-specific value B is returned. When Tenant 2 requests the value of Toggle 1, the tenant-specific value C is returned. When a Tenant 3 requests the value of Toggle 1, the global value A is returned. Continuing this example, if Toggles 1 and 2 are queried and Tenant 1 has no specific value for Toggle 2, then the tenant-specific value for Toggle 1 and the global value for Toggle 2 are returned in response to the query, for example. As such, based on the tenant, the global or general value is overridden to return the tenant-specific value.

The example process 860 the illustrated example of FIG. 9 then terminates but may be repeated, for example, upon a subsequent get request for the example toggle database 126. In the illustrated example, control returns to the example instructions of FIG. 8.

Figure 10:
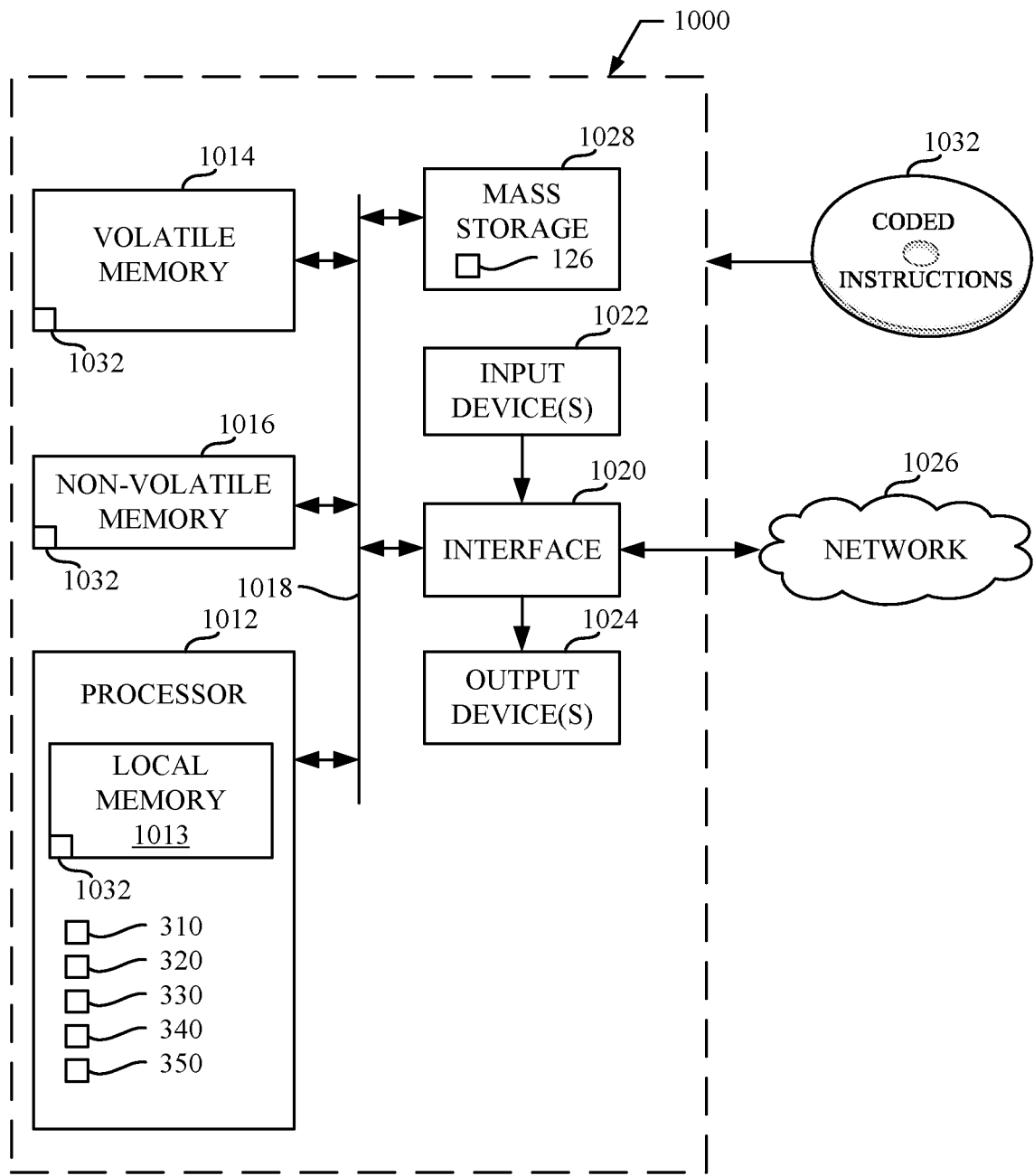
FIG. 10 is a block diagram of an example processor platform structured to execute the instructions of FIGS. 7, 8, and/or 9 to implement the example provisioning controller of FIGS. 2 and/or 3.

FIG. 10 is a block diagram of an example processor platform 1000 structured to execute the instructions of FIG. 5 to implement the example provisioning controller 220 of FIGS. 2 and/or 3. The processor platform 1000 can be, for example, a server, a personal computer, a workstation, a self-learning machine (e.g., a neural network), a mobile device (e.g., a cell phone, a smart phone, a tablet such as an iPad'), an Internet appliance, a gaming console, a headset or other wearable device, or other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1012 implements the example request processor 310, the example content retriever 320, the example toggle manager 330, the example content compiler 340, and/or the example result transmitter 350.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip, and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIGS. 6-9 can be stored in the mass storage device 1028, in the volatile memory 1014, in the non-volatile memory 1016, and/or on a removable non-transitory computer readable storage medium such as a CD or DVD. The example mass storage device 1028 can implement the example toggle database 126 of FIGS. 1 and/or 3, for example. Alternatively or in addition, the example feature toggle database 126 can be implemented separately and accessible to the processor platform 1000 via the network 1026.

Figure 11:
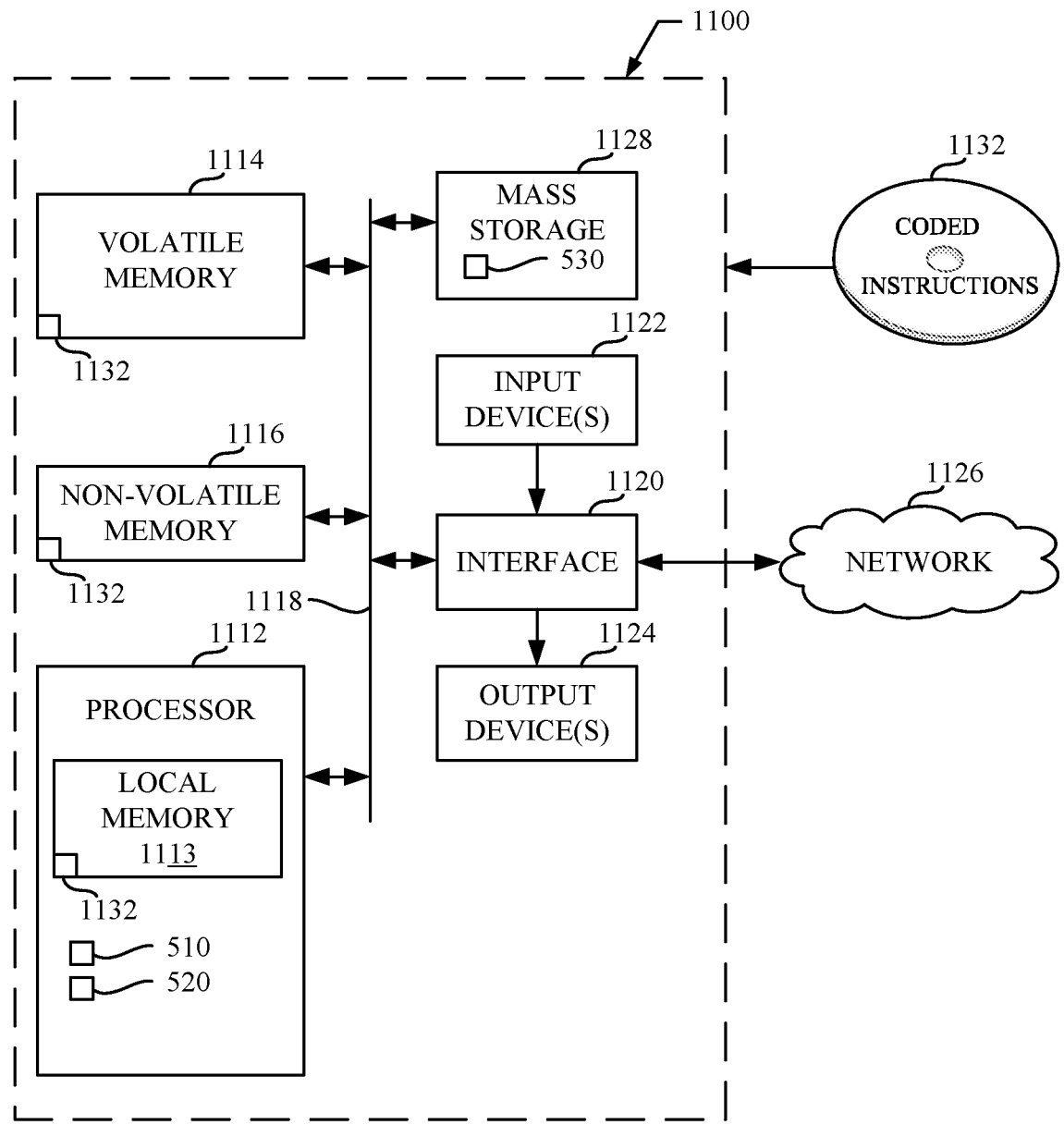
FIG. 11 is a block diagram of an example processor platform structured to execute the instructions of FIGS. 7, 8, and/or 9 to implement the tenant administrator of FIGS. 2 and/or 5.

FIG. 11 is a block diagram of an example processor platform 1100 structured to implement the example tenant administrator 230 of FIGS. 2 and/or 5. The processor platform 1100 can be, for example, a server, a personal computer, a workstation, a self-learning machine (e.g., a neural network), a mobile device (e.g., a cell phone, a smart phone, a tablet such as an iPad™), an Internet appliance, a gaming console, a headset or other wearable device, or other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1112 implements the example tenant interface 510 and the example tenant determiner 520.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller. The example tenant data store 530 can be implemented using one or more of the memory 1114, 1116, for example.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip, and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives.

The machine executable instructions 1132 of FIGS. 6-9 may be stored in the mass storage device 1128, in the volatile memory 1114, in the non-volatile memory 1116, and/or on a removable non-transitory computer readable storage medium such as a CD or DVD. The example mass storage device 1128 can implement the example tenant data store 530 of FIG. 5, for example.

Figure 12:
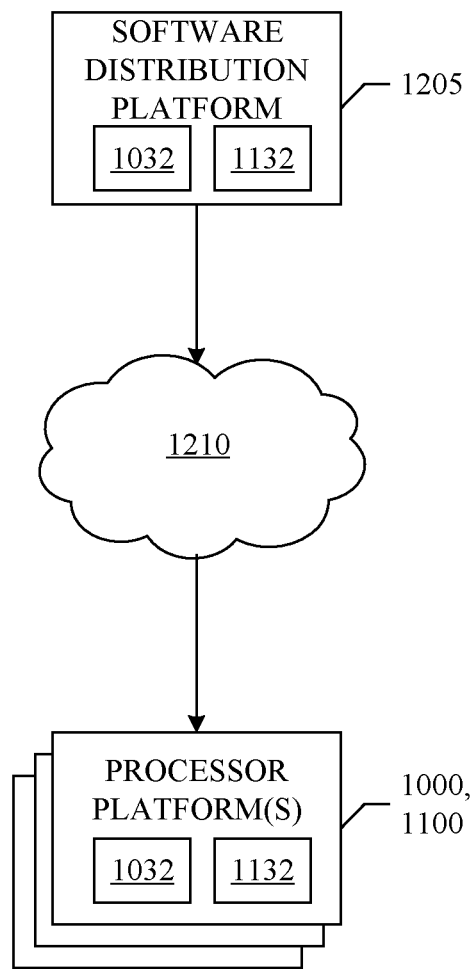
FIG. 12 is a block diagram of an example software distribution platform to distribute software (e.g., software corresponding to the example computer readable instructions of FIGS. 7, 8, and/or 9) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1205 to distribute software such as the example computer readable instructions 1032 of FIG. 10 and/or the example computer readable instructions 1132 of FIG. 11 to third parties is illustrated in FIG. 12. The example software distribution platform 1205 can be implemented by any computer server, data facility, cloud service, etc., capable of storing and transmitting software to other computing devices. The third parties can be customers of the entity owning and/or operating the software distribution platform. For example, the entity that owns and/or operates the software distribution platform may be a developer, a seller, and/or a licensor of software such as the example computer readable instructions 1032 of FIG. 10 and/or the example computer readable instructions 1132 of FIG. 11. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the computer readable instructions 1032, which may correspond to the example computer readable instructions 700 of FIGS. 7, 8, and/or 9, and/or store the computer readable instructions 1132, which may correspond to the example computer readable instructions 700 of FIGS. 7, 8, and/or 9, as described above.

The one or more servers of the example software distribution platform 1205 are in communication with a network 1210, which can correspond to any one or more of the Internet and/or any of the example networks 150, 1026, 1126 described above. In some examples, the one or more servers are responsive to requests to transmit the software to a requesting party as part of a commercial transaction. Payment for the delivery, sale and/or license of the software can be handled by the one or more servers of the software distribution platform and/or via a third party payment entity. The servers enable purchasers and/or licensors to download the computer readable instructions 1032, 1132 from the software distribution platform 1205. For example, the software, which can correspond to the example computer readable instructions 700 of FIGS. 7, 8, and/or 9, can be downloaded to the example processor platform 1000, which is to execute the computer readable instructions 1032 to implement the example provisioning controller 220 of FIGS. 2, 3, and/or 4. Additionally or alternatively, the software can correspond to the example computer readable instructions 700 of FIGS. 7, 8, and/or 9 can be downloaded to the example processor platform 1100, which is to execute the computer readable instructions 1132 to implement the example tenant administrator 230 of FIGS. 2 and/or 5. In some examples, one or more servers of the software distribution platform 1205 periodically offer, transmit, and/or force updates to the software (e.g., the example computer readable instructions 1032 of FIG. 10, the example computer readable instructions 1132 of FIG. 11) to ensure improvements, patches, updates, etc. are distributed and applied to the software at the end user devices.

From the foregoing, it will be appreciated that example methods, apparatus and articles of manufacture have been disclosed that enable dynamic composition and adjustment of provisioned resources based on feature toggles. Such feature toggles can be maintained, applied, and updated in a hierarchical or organizational manner based on an associated tenant, system user, and/or other criterion for selective application of one or more feature toggle values. The disclosed methods, apparatus and articles of manufacture improve the efficiency of using a computing device by reducing or eliminating down-time involved in software and/or other functionality updates resulting from testing, releasing, and/or updating program code and/or other features. That is, processor uptime can be increased, processor responsiveness can be improved, and processor cycles can be used more efficiently to perform automation tasks, rather than waiting for a user/system to refresh a cache and/or provide other updates offline. The disclosed methods, apparatus and articles of manufacture are accordingly directed to one or more improvement(s) in the functioning of a computer.

Rather than storing platform functionality/features in a cache or other transient memory, which is cleared when the cloud and/or other virtualized environment and/or a component of the environment is refreshed, reset, restarted, rebooted, etc., feature toggles representing platform functionality/features are stored in a database and/or other data store that persists across refreshes/restarts. Additionally, the database provides a larger, more flexible, more dynamic body for toggle data storage, not limited by the size of a cache or RAM or similar memory. Instead, the persistent database can be resized to accommodate a variety of feature toggles according to a hierarchy and/or other organization. Updates to the database can be made instantly available to a querying service, rather than requiring a system reboot, manual reconfiguration, etc. As such, changes to feature toggle content in the database is separated from and operates independent of provisioning services and control to provide functionality to users of the cloud platform. In certain examples, by centralizing feature toggles in a database, any part of the data center can access feature toggles, change feature toggle values, use feature toggles in resource provisioning, etc. Storing feature toggles in the database allows the toggles to be modified with REST requests, without code changes.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example methods, apparatus, systems, and articles of manufacture to dynamically determine and exercise feature toggles based on tenant and/or other criterion in a virtualized computing environment are disclosed herein. Further examples and combinations thereof include the following:

Example 1 is a resource provisioning apparatus including: a request processor to process a provisioning request in a software-defined data center for provisioning of a resource; and a toggle manager. The example toggle manager is to: determine a feature toggle associated with the resource of the provisioning request, the resource associated with a tenant of the software-defined data center, the tenant identified using a first tenant identifier; retrieve the feature toggle from a database using the first tenant identifier, the feature toggle to have a first value for the first tenant identifier and a second value for a second tenant identifier; process the feature toggle to provision the resource according to the first value of the feature toggle; and facilitate provisioning of the resource according to the first value.

Example 2 includes example 1 and further includes: a content retriever to retrieve information for the resource of the provisioning request; a content compiler to combine the information with the first value of the feature toggle; and a result transmitter to transmit the combined information with first value to provision the resource.

Example 3 includes example 1, wherein the toggle manager includes: a toggle interface to analyze the provisioning request to determine the feature toggle associated with the resource of the provisioning request; a tenant identifier to identify the tenant and the associated first tenant identifier; and a toggle processor. The example toggle processor is to: retrieve the feature toggle from the database using the first tenant identifier; process the feature toggle to provision the resource according to the first value of the feature toggle; and facilitate provisioning of the resource according to the first value.

Example 4 includes example 3, wherein the toggle manager further includes a toggle updater to update the feature toggle in the database.

Example 5 includes example 1, wherein the toggle manager is to select a processing strategy for toggle retrieval, the processing strategy corresponding to a format for the first value and the second value of the feature toggle.

Example 6 includes example 1, wherein the database is to organize feature toggles and associated values according to a hierarchy, the hierarchy including system values and tenant-specific values for one or more feature toggles, including a first tenant-specific value to override a first system value for the respective tenant.

Example 7 includes example 1, wherein the toggle manager is to analyze the provisioning request to identify the feature toggle associated with the resource of the provisioning request and an associated toggle operation, the toggle operation to include at least one of a toggle update, a toggle query, or a get toggles request.

Example 8 is at least one non-transitory computer readable storage medium including instructions that, when executed, cause at least one processor to at least: determine, using a first service, a feature toggle associated with a resource of a provisioning request, the resource associated with a tenant of a software-defined data center, the tenant identified using a first tenant identifier; retrieve, using a second service, the feature toggle from a database using the first tenant identifier, the feature toggle to have a first value for the first tenant identifier and a second value for a second tenant identifier; process, using the second service, the feature toggle to provision the resource according to the first value of the feature toggle; and facilitate provisioning of the resource according to the first value.

Example 9 includes example 8, wherein the instructions, when executed, further cause the at least one processor to: retrieve information for the resource of the provisioning request; combine the information with the first value of the feature toggle; and transmit the combined information with first value to provision the resource.

Example 10 includes example 8, wherein the instructions, when executed, further cause the at least one processor to update the feature toggle in the database.

Example 11 includes example 8, wherein the instructions, when executed, further cause the at least one processor to select a processing strategy for toggle retrieval, the processing strategy corresponding to a format for the first value and the second value of the feature toggle.

Example 12 includes example 8, wherein the instructions, when executed, further cause the at least one processor to organize feature toggles and associated values according to a hierarchy, the hierarchy including system values and tenant-specific values for one or more feature toggles, including a first tenant-specific value to override a first system value for the respective tenant.

Example 13 includes example 8, wherein the instructions, when executed, further cause the at least one processor to analyze the provisioning request to identify the feature toggle associated with the resource of the provisioning request and an associated toggle operation, the toggle operation to include at least one of a toggle update, a toggle query, or a get toggles request.

Example 14 is a method to process a feature toggle in a provisioning request. The method includes: determining, by executing an instruction with at least one processor, a feature toggle associated with a resource of the provisioning request, the resource associated with a tenant of a software-defined data center, the tenant identified using a first tenant identifier; retrieving the feature toggle from a database using the first tenant identifier, the feature toggle to have a first value for the first tenant identifier and a second value for a second tenant identifier; processing, by executing an instruction with the at least one processor, the feature toggle to provision the resource according to the first value of the feature toggle; and facilitating provisioning of the resource according to the first value.

Example 15 includes example 14 and further includes: retrieving information for the resource of the provisioning request; combining the information with the first value of the feature toggle; and transmitting the combined information with first value to provision the resource.

Example 16 includes example 14 and further includes updating the feature toggle in the database.

Example 17 includes example 14 and further includes selecting a processing strategy for toggle retrieval, the processing strategy corresponding to a format for the first value and the second value of the feature toggle.

Example 18 includes example 14 and further includes organizing feature toggles and associated values according to a hierarchy, the hierarchy including system values and tenant-specific values for one or more feature toggles, including a first tenant-specific value to override a first system value for the respective tenant.

Example 19 includes example 14 and further includes analyzing the provisioning request to identify the feature toggle associated with the resource of the provisioning request and an associated toggle operation, the toggle operation to include at least one of a toggle update, a toggle query, or a get toggles request.

Example 20 is a resource provisioning apparatus including: memory circuitry to include instructions; and at least one processor to execute the instructions to at least: determine a feature toggle associated with a resource of a provisioning request, the resource associated with a tenant of a software-defined data center, the tenant identified using a first tenant identifier; retrieve the feature toggle from a database using the first tenant identifier, the feature toggle to have a first value for the first tenant identifier and a second value for a second tenant identifier; process the feature toggle to provision the resource according to the first value of the feature toggle; and facilitate provisioning of the resource according to the first value.

Example 21 is an apparatus to provision a resource in a cloud environment. The example apparatus includes: means for determining a feature toggle associated with a resource of a provisioning request, the resource associated with a tenant identified using a first tenant identifier; means for retrieving the feature toggle from a database using the first tenant identifier, the feature toggle to have a first value for the first tenant identifier and a second value for a second tenant identifier; and means for processing the feature toggle to provision the resource according to the first value of the feature toggle.

Example 22 is a server to distribute first instructions on a network. The example the server includes: at least one storage device including second instructions; and at least one processor to execute the second instructions to transmit the first instructions over the network, the first instructions, when executed, to cause at least one device to: determine a feature toggle associated with a resource of a provisioning request, the resource associated with a tenant of a software-defined data center, the tenant identified using a first tenant identifier; retrieve the feature toggle from a database using the first tenant identifier, the feature toggle to have a first value for the first tenant identifier and a second value for a second tenant identifier; process the feature toggle to provision the resource according to the first value of the feature toggle; and facilitate provisioning of the resource according to the first value.

The following claims are hereby incorporated into this Detailed Description by this reference, with each claim standing on its own as a separate embodiment of the present disclosure.

What is claimed is:

1. A resource provisioning apparatus comprising:
   memory;
   instructions in the memory; and
   processor circuitry to execute the instructions to implement at least:
      a request processor to receive and process a provisioning request in a software-defined data center (SDDC) for provisioning of a resource of the SDDC;
      a toggle manager to:
         determine a feature toggle associated with the resource of the provisioning request, the resource associated with a tenant of the SDDC, the tenant identified using a first tenant identifier; and
         retrieve the feature toggle from a database stored in one or more database servers of the SDDC using the first tenant identifier, the feature toggle to have a first value for the first tenant identifier and a second value for a second tenant identifier, the database to store first program code representing the first value and second program code representing the second value, the first program code and the second program code stored separate from third program code representing the resource and dynamically updatable in response to receiving the provisioning request without recoding of the third program code, each of the first value and the second value to differently modify execution of the resource, the first program code and the second program code different from the third program code;
      a content retriever to retrieve the third program code for the resource of the provisioning request;
      a content compiler to:
         compile, in response to receiving the provisioning request, the first program code for the feature toggle with the third program code for the resource to form compiled code to enable provisioning of the resource according to the first value of the feature toggle; and
         send the compiled code to a result transmitter;
      the result transmitter to transmit the compiled code to an automation executor; and the automation executor to provision and execute the resource according to the first value.

2. The apparatus of claim 1, wherein the toggle manager includes:
   a toggle interface to analyze the provisioning request to determine the feature toggle associated with the resource of the provisioning request;
   a tenant identifier to identify the tenant and the associated first tenant identifier;
   a toggle updater to update the feature toggle in the database; and
   a toggle processor to:
      retrieve the feature toggle from the database using the first tenant identifier; and
      provide the feature toggle from the database to the content compiler.

3. The apparatus of claim 1, wherein the toggle manager is to select a processing strategy for toggle retrieval, the processing strategy corresponding to a format for the first value and the second value of the feature toggle.

4. The apparatus of claim 1, wherein the database is to organize feature toggles and associated values according to a hierarchy, the hierarchy including system values and tenant-specific values for one or more feature toggles, including a first tenant-specific value to override a first system value for the respective tenant.

5. The apparatus of claim 1, wherein the toggle manager is to analyze the provisioning request to identify the feature toggle associated with the resource of the provisioning request and an associated toggle operation, the toggle operation to include at least one of a toggle update, a toggle query, or a get toggles request.

6. The apparatus of claim 1, wherein the compiled code is first compiled code, and further including:
   the content compiler to:
      compile, in response to receiving the provisioning request, the second program code for the feature toggle with the third program code for the resource to form second compiled code to enable provisioning of the resource according to the second value of the feature toggle; and
      send the second compiled code to the result transmitter;
   the result transmitter to transmit the second compiled code to the automation executor; and
   the automation executor to provision and execute the resource according to the second value.

7. At least one non-transitory computer readable storage medium comprising instructions that, when executed, cause at least one processor to at least:
   receive and process a provisioning request in a software-defined data center (SDDC) for provisioning of a resource of the SDDC;

determine a feature toggle associated with the resource of a provisioning request, the resource associated with a tenant of the SDDC, the tenant identified using a first tenant identifier;

retrieve the feature toggle from a database stored in one or more database servers of the SDDC using the first tenant identifier, the feature toggle to have a first value for the first tenant identifier and a second value for a second tenant identifier, the database to store first program code representing the first value and second program code representing the second value, the first program code and the second program code stored separate from third program code representing the resource and dynamically updatable in response to receiving the provisioning request without recoding of the third program code, each of the first value and the second value to differently modify execution of the resource, the first program code and the second program code different from the third program code;

retrieve the third program code for the resource of the provisioning request;

compile, in response to receiving the provisioning request, the first program code for the feature toggle with the third program code for the resource to form compiled code to enable provisioning of the resource according to the first value of the feature toggle;

transmit the compiled code; and provision and execute the resource according to the first value.

8. The at least one computer readable storage medium of claim 7, wherein the instructions, when executed, further cause the at least one processor to:

analyze the provisioning request to determine the feature toggle associated with the resource of the provisioning request;

identify the tenant and the associated first tenant identifier;

update the feature toggle in the database;

retrieve the feature toggle from the database using the first tenant identifier; and provide the feature toggle from the database.

9. The at least one computer readable storage medium of claim 7, wherein the instructions, when executed, further cause the at least one processor to select a processing strategy for toggle retrieval, the processing strategy corresponding to a format for the first value and the second value of the feature toggle.

10. The at least one computer readable storage medium of claim 7, wherein the instructions, when executed, further cause the at least one processor to organize feature toggles and associated values according to a hierarchy, the hierarchy including system values and tenant-specific values for one or more feature toggles, including a first tenant-specific value to override a first system value for the respective tenant.

11. The at least one computer readable storage medium of claim 7, wherein the instructions, when executed, further cause the at least one processor to analyze the provisioning request to identify the feature toggle associated with the resource of the provisioning request and an associated toggle operation, the toggle operation to include at least one of a toggle update, a toggle query, or a get toggles request.

12. The at least one computer readable storage medium of claim 7, wherein the compiled code is first compiled code, and wherein the instructions, when executed, further cause the at least one processor to:

compile, in response to receiving the provisioning request, the second program code for the feature toggle with the third program code for the resource to form second compiled code to enable provisioning of the resource according to the second value of the feature toggle;

transmit the second compiled code; and provision and execute the resource according to the second value.

13. A method comprising:

receiving and processing a provisioning request in a software-defined data center (SDDC) for provisioning of a resource of the SDDC;

determining a feature toggle associated with the resource of the provisioning request, the resource associated with a tenant of the SDDC, the tenant identified using a first tenant identifier;

retrieving the feature toggle from a database stored in one or more database servers of the SDDC using the first tenant identifier, the feature toggle to have a first value for the first tenant identifier and a second value for a second tenant identifier, the database to store first program code representing the first value and second program code representing the second value, the first program code and the second program code stored separate from third program code representing the resource and dynamically updatable in response to receiving the provisioning request without recoding of the third program code, each of the first value and the second value to differently modify execution of the resource, the first program code and the second program code different from the third program code;

retrieving the third program code for the resource of the provisioning request;

compiling, in response to receiving the provisioning request, the first program code for the feature toggle with the third program code for the resource to form compiled code to enable provisioning of the resource according to the first value of the feature toggle;

transmitting the compiled code; and provisioning and executing the resource according to the first value.

14. The method of claim 13, further including:

analyzing the provisioning request to determine the feature toggle associated with the resource of the provisioning request;

identifying the tenant and the associated first tenant identifier;

updating the feature toggle in the database;

retrieving the feature toggle from the database using the first tenant identifier; and providing the feature toggle from the database.

15. The method of claim 13, further including selecting a processing strategy for toggle retrieval, the processing strategy corresponding to a format for the first value and the second value of the feature toggle.

16. The method of claim 13, further including organizing feature toggles and associated values according to a hierarchy, the hierarchy including system values and tenant-specific values for one or more feature toggles, including a first tenant-specific value to override a first system value for the respective tenant.

17. The method of claim 13, further including analyzing the provisioning request to identify the feature toggle associated with the resource of the provisioning request and an associated toggle operation, the toggle operation to include at least one of a toggle update, a toggle query, or a get toggles request.

18. The method of claim 13, wherein the compiled code is first compiled code, and further including:
- compiling, in response to receiving the provisioning request, the second program code for the feature toggle with the third program code for the resource to form second compiled code to enable provisioning of the resource according to the second value of the feature toggle;
- transmitting the second compiled code; and
- provisioning and executing the resource according to the second value.

\* \* \* \* \*